United States Patent
Lee et al.

(10) Patent No.: US 9,509,828 B2
(45) Date of Patent: Nov. 29, 2016

(54) METHOD OF PROVIDING NOTIFICATION AND ELECTRONIC DEVICE THEREOF

(71) Applicant: Samsung Electronics Co., Ltd., Gyeonggi-do (KR)

(72) Inventors: Kyung-Hee Lee, Gyeonggi-do (KR); Sung-Hyuk Shin, Gyeonggi-do (KR); Ken-Hyung Park, Gyeonggi-do (KR); Ki-Huk Lee, Gyeonggi-do (KR); Chi-Hyun Cho, Gyeonggi-do (KR); Chang-Ryong Heo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/476,661

(22) Filed: Sep. 3, 2014

(65) Prior Publication Data

US 2015/0061862 A1 Mar. 5, 2015

(30) Foreign Application Priority Data

Sep. 3, 2013 (KR) .......................... 10-2013-0105774

(51) Int. Cl.
*G08B 1/08* (2006.01)
*H04M 1/725* (2006.01)
*H04W 88/02* (2009.01)

(52) U.S. Cl.
CPC .......... *H04M 1/7253* (2013.01); *H04W 88/02* (2013.01); *H04M 1/72597* (2013.01)

(58) Field of Classification Search
CPC .......................... H04M 1/7253; H04W 88/02
USPC ................. 340/539.11, 635; 455/567, 556.1
See application file for complete search history.

(56) References Cited

U.S. PATENT DOCUMENTS

| | | | |
|---|---|---|---|
| 7,016,707 B2 | 3/2006 | Fujisawa et al. | |
| 7,130,664 B1* | 10/2006 | Williams | H04M 1/7253 455/567 |
| 7,272,412 B2* | 9/2007 | Adamson | H04M 1/7253 455/556.1 |
| 7,305,257 B2* | 12/2007 | Ladouceur | H04M 19/04 455/567 |
| 8,165,640 B2* | 4/2012 | Mullen | H04M 1/7253 455/567 |
| 8,275,327 B2 | 9/2012 | Yi et al. | |

(Continued)

FOREIGN PATENT DOCUMENTS

KR 10-2010-0050028 A 5/2010

OTHER PUBLICATIONS

International Search Report dated Sep. 17, 2014 in connection with International Application No. PCT/KR2014/004859; 3 pages.

(Continued)

*Primary Examiner* — John A Tweel, Jr.

(57) ABSTRACT

A method of providing notification information in an electronic device includes establishing a wireless communication between the electronic device and an external device, detecting an event to be notified in the electronic device, obtaining a status of the electronic device, and determining whether to transmit an notification on the event to an external device, based on the status of the electronic device. An electronic device includes a transceiver configured to establish a wireless communication between the electronic device and an external device, and a processor configured to detect an event to be notified in the electronic device, obtain a status of the electronic device, and determine whether to transmit an notification on the event to an external device, based on the status of the electronic device. Other embodiments are also disclosed.

20 Claims, 13 Drawing Sheets

(56) References Cited

U.S. PATENT DOCUMENTS

2002/0115478 A1 8/2002 Fujisawa et al.
2005/0272408 A1 12/2005 Wilkes-Gibbs et al.
2010/0112964 A1 5/2010 Yi et al.
2010/0227642 A1 9/2010 Kim et al.
2011/0300804 A1 12/2011 Lu
2012/0086578 A1 4/2012 Moss et al.

OTHER PUBLICATIONS

Written Opinion of International Searching Authority dated Sep. 17, 2014 in connection with International Application No. PCT/KR2014/004859; 6 pages.

* cited by examiner

METHOD OF PROVIDING NOTIFICATION AND ELECTRONIC DEVICE THEREOF

PRIORITY

The present application is related to and claims the benefit under 35 U.S.C. §119(a) of a Korean patent application No. 10-2013-0105774 filed in the Korean Intellectual Property Office on Sep. 3, 2013, the entire disclosure of which is hereby incorporated by reference.

TECHNICAL FIELD

The present invention relates to a method of providing notification in an electronic device and the electronic device thereof.

BACKGROUND

As mobile communication technology develops, electronic devices are provided in various forms such as a smart phone, a wearable device, and a tablet personal computer (PC) and may transmit and receive various data through a communication system between electronic devices. The electronic device may provide various functions such as a phone function, a message function, and an alarm function.

The electronic device may provide an event that has occurred in an electronic device to a user through various output methods and transmit and receive information about an event to and from another electronic device with various communication methods.

In the conventional art, when a user uses a plurality of electronic devices for providing notification, by providing the same notification information through each electronic device, unnecessary notification may be repeatedly provided, and thus in each electronic device, power consumption may increase. Further, as notification information checked through the electronic device is repeatedly provided through another device, inconvenience in which the user should repeatedly check the same notification information may occur.

SUMMARY

A method in an electronic device is provided. The method includes establishing a wireless communication between the electronic device and an external device, detecting an event to be notified in the electronic device, obtaining a status of the electronic device, and determining whether to transmit an notification on the event to an external device, based on the status of the electronic device.

In some embodiments, the electronic device is configured to transmit the notification to the external device when a screen of the electronic device is not available to display a notification.

In some embodiments, the electronic device is in a power saving mode.

In some embodiments, the screen of the electronic device is being occupied by a software program.

In some embodiments, the method further includes obtaining a status of the external device.

In some embodiments, the method further includes determining whether to present the notification on a screen of the electronic device, based on the status of the external object.

In some embodiments, the electronic device is configured to display the notification when the external device is not available to display a notification.

In some embodiments, the method further includes determining whether the event to be notified has a priority over the status of the electronic device.

In some embodiments, the method further includes determining which one of the electronic device and the external device being positioned within visibility of a user, displaying the notification on the determined device.

In some embodiments, the method further includes measuring a distance between the electronic device and the external device, transmitting the notification when the distance is less than a threshold distance.

In some embodiments, the method further includes when the notification is transmitted to the external device, determining whether the notification on the external device is read, storing a status of reading the notification in the electronic device.

An electronic device is provided. The electronic device includes a transceiver configured to establish a wireless communication between the electronic device and an external device, a processor configured to detect an event to be notified in the electronic device, obtain a status of the electronic device, and determine whether to transmit an notification on the event to an external device, based on the status of the electronic device.

In some embodiments, the electronic device is configured to transmit the notification to the external device when a screen of the electronic device is not available to display a notification.

In some embodiments, the electronic device is in a power saving mode.

In some embodiments, the screen of the electronic device is being occupied by a software program.

In some embodiments, the processor is further configured to obtain a status of the external device, and determine whether to present the notification on a screen of the electronic device, based on the status of the external object.

In some embodiments, the electronic device is configured to display the notification when the external device is not available to display a notification.

In some embodiments, the processor is further configured to determine whether the event to be notified has a priority over the status of the electronic device.

In some embodiments, the processor is further configured to determine which one of the electronic device and the external device being positioned within visibility of a user, display the notification on the determined device.

In some embodiments, the processor is further configured to measure a distance between the electronic device and the external device.

In some embodiments, the processor is further configured to transmit the notification when the distance is less than a threshold distance.

In some embodiments, the processor is further configured to, when the notification is transmitted to the external device, determine whether the notification on the external device is read, In some embodiments, the processor is further configured to cause a status of reading the notification to be stored in the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
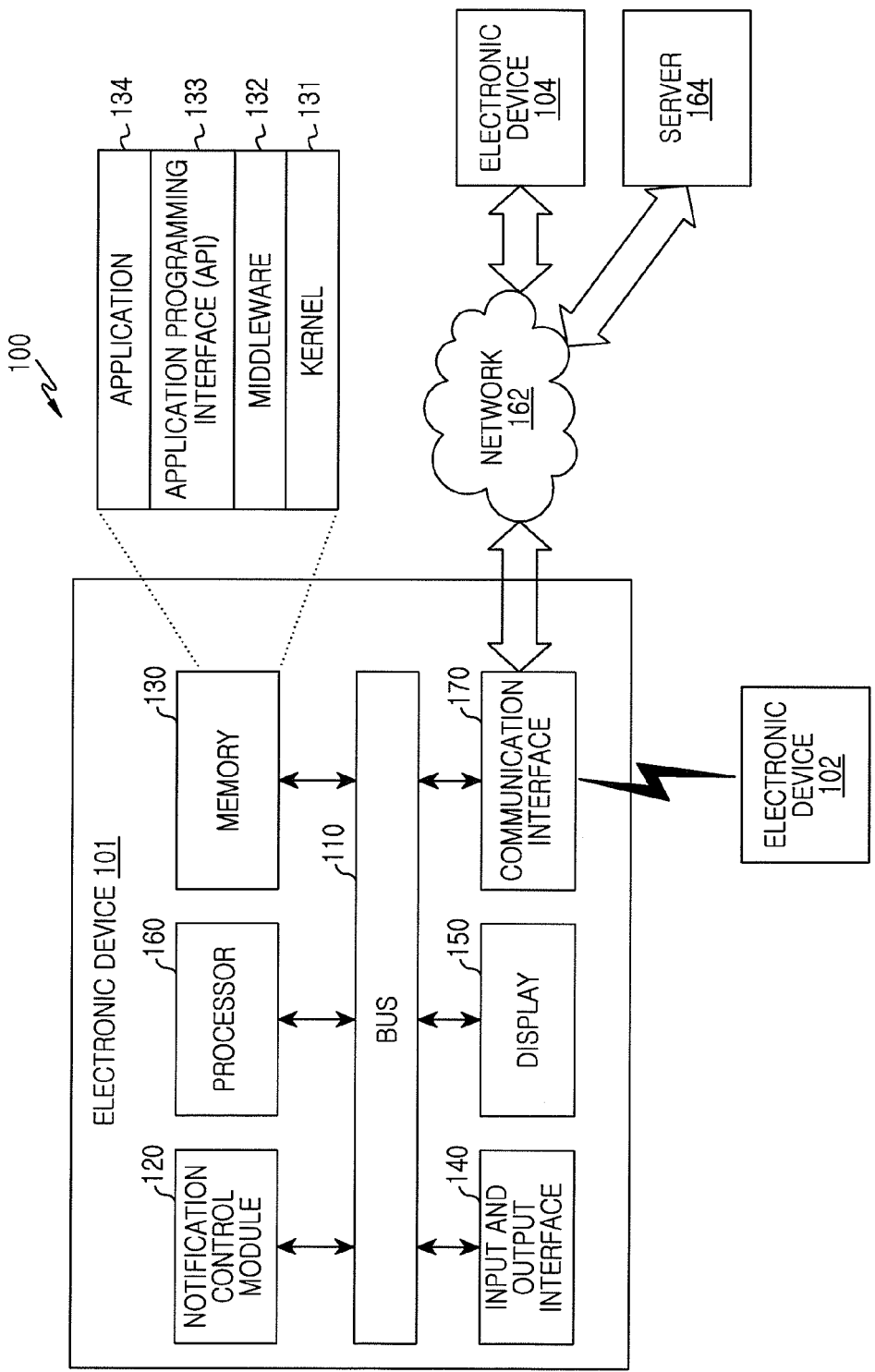
FIG. 1 is a block diagram illustrating an electronic device according to various embodiments of the present invention.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, in various embodiments of the present invention, a method of outputting notification of various data received in an electronic device or an event that has occurred in an electronic device and the electronic device thereof are described with reference to the accompanying drawings.

In various embodiments according to a method of providing notification and an electronic device thereof, it can be determined whether at least one another electronic device connected to the electronic device can be used and at least one electronic device that provides notification information according to a designated reference can be determined. Further, in various embodiments according to a method of providing notification and an electronic device thereof, when an event to provide notification occurs in an electronic device in which at least one function is executing, information on whether to output notification or whether the output notification has been checked can be managed.

While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated. The same reference numbers are used throughout the drawings to refer to the same or like parts. Detailed descriptions of well-known functions and structures incorporated herein may be omitted to avoid obscuring the subject matter of the present invention.

An expression of "comprising" and "can comprise" used in the present invention indicates existence of a corresponding function, operation, element and does not limit at least one additional function, operation, and element. In addition, in the present invention, a term "comprise" or "have", will be understood to imply the inclusion of a characteristic, a numeral, a step, an operation, a element, a component, or a combination thereof described in the specification but not the exclusion of at least one another characteristic, numeral, step, operation, element, component, or combination thereof.

An electronic device according to the present invention may be a device including a communication function. For example, the electronic device may include a smart phone, a tablet personal computer (tablet PC), a mobile phone, an audiovisual phone, an e-book reader, a desktop PC, a laptop PC, a netbook computer, a personal digital assistant (PDA), a portable multimedia player (PMP), an MP3 player, a mobile medical device, a camera, and a wearable device (e.g., at least one of a head-mounted-device (HMD) such as electronic glasses, electronic clothes, an electronic bracelet, an electronic necklace, electronic accessories, and a smart watch).

According to an embodiment, the electronic device can be a smart home appliance having a communication function. The smart home appliance can include at least one of, for example, a television, a digital video disk (DVD) player, an audio device, a refrigerator, an air-conditioner, a cleaner, an oven, a microwave oven, a washing machine, an air cleaner, a set-top box, a television box (e.g., Samsung HomeSync™, Apple TV™, or Google TV™), game consoles, an electronic dictionary, an electronic key, a camcorder, and an electronic frame.

According to an embodiment, the electronic device can include at least one of various medical devices (e.g., a magnetic resonance angiography (MRA), a magnetic resonance imaging (MRI), a computed tomography (CT), a camera, and an ultrasonic wave device), a navigation device, a global positioning system (GPS) receiver, an event data recorder (EDR), a flight data recorder (FDR), a vehicle infotainment device, a ship electronic equipment (e.g., a navigation device and a gyro compass for a ship), avionics, and a security device.

According to an embodiment, the electronic device can include at least one of a portion of furniture or a building/structure having a communication function, an electronic board, an electronic signature receiving device, a projector, and various measuring devices (e.g., water supply, electricity, gas, or electric wave). The electronic device according to the present invention can be at least one combination of the foregoing various devices. Further, it will become apparent to a person of common skill in the art that the electronic device according to the present invention is not limited to the foregoing devices. Hereinafter, an electronic device according to various embodiments will be described with reference to the accompanying drawings. A term 'user' used in various embodiments can include a person who uses an electronic device or a device (e.g., artificial intelligence electronic device) using an electronic device.

FIG. 1 is a block diagram illustrating an electronic device 101 according to various embodiments of the present invention.

Referring to FIG. 1, the electronic device 101 can include a notification control module 120, a bus 110, a processor 160, a memory 130, an input and output interface 140, a display 150, and a communication interface 170.

The notification control module 120 can refer to a database stored at the memory 130 of the electronic device 101 or a database of each application. When the notification control module 120 detects that an event to provide notification to the electronic device 101 has occurred, the notification control module 120 can determine whether the electronic device 101 is to output the notification or another electronic device (e.g., an electronic device 102 or an electronic device 104) connected to the electronic device 101 is to output the notification. Further, the notification control module 120 can acquire information about whether notification information related to notification output through the electronic device 101 or another electronic device has been checked by a user of the electronic device 101 and update a database stored at, for example, the memory 130 or a database of each application. When a check history of the notification information does not exist, the notification control module 120 can process to re-output notification corresponding to the notification information through the electronic device 101 or another electronic device.

The bus 110 can be a circuit that connects the foregoing elements and that transfers communication (e.g., a control message) between the foregoing elements.

The processor 160 can receive an instruction from the foregoing another elements (e.g., the memory 130, the input and output interface 140, the display 150, and the communication interface 170) through, for example, the bus 110, decode the received instruction, and execute a calculation or a data processing according to the decoded instruction.

The memory 130 can store an instruction or data received from the processor 160 or other elements (e.g., the input and output interface 140, the display 150, and the communication interface 170) or generated by the processor 160 or other elements. The memory 130 can include programming modules such as a kernel 131, middleware 132, an application programming interface (API) 133, or an application 134. The foregoing each programming module can be formed with software, firmware, hardware, or at least two combinations thereof.

The kernel 131 can control or manage system resources (e.g., the bus 110, the processor 160, or the memory 130) used for executing an operation or a function embodied in the remaining programming modules, for example, the middleware 132, the API 133, or the application 134. Further, the kernel 131 can provide an interface that accesses to an individual element of the electronic device 101 in the middleware 132, the API 133, or the application 134 to control or manage the individual element.

The middleware 132 can function as an intermediary that enables the API 133 or the application 134 to communicate with the kernel 131 to transmit and receive data. Further, the middleware 132 can perform load balancing of a work request using a method of aligning a priority that can use a system resource (e.g., the bus 110, the processor 160, or the memory 130) of the electronic device 101 in, for example, at least one application of the (plurality of) applications 134 in relation to work requests received from the (plurality of) applications 134.

The API 133 is an interface in which the application 134 can control a function in which the kernel 131 or the middleware 132 provides and can include at least one interface or function for, for example, file control, window control, image processing, or character control.

The input and output interface 140 receives an input of an instruction or data from, for example, the user to transfer the instruction or the data to the processor 160 or the memory 130 through the bus 110. The display 150 can display an image or data to the user.

The communication interface 170 can connect communication between the electronic device 101 and another electronic device 102 or electronic device 104, or a server 164. The communication interface 170 can support a predetermined short range communication protocol (e.g., wireless fidelity (Wifi), Bluetooth (BT), near field communication (NFC), or communication of a predetermined network (e.g., Internet, a local area network (LAN), a wire area network (WAN), a telecommunication network, a cellular network, a satellite network, or plain old telephone service (POTS)) 162. The electronic devices 102 and 104 each can be the same (e.g., the same type) device as the electronic device 101 or can be a device different (e.g., different type) from the electronic device 101.

The electronic device 101 can be connected to another electronic device 102 through network communication. Hereinafter, when describing various embodiments, as in another electronic device 102 or the second electronic device 102 (e.g., when the electronic device 101 is represented with a first electronic device 101), another electronic device connected to the electronic device 101 can be represented with the electronic device 102 shown in FIG. 1. In FIG. 1, the electronic device 102 and the electronic device 104 are divided to describe a method connected to the electronic device 101, and unless a communication method such as short range wireless communication (not shown) or the network 162 is distinguished, the electronic device 102 or the electronic device 104 can be represented with another electronic device connected to the electronic device 101. Therefore, unless it is specially separately described, the electronic device 102 described in various embodiments and embodiments thereof can be applied to the electronic device 104 connected through the network 162. The server 164 displayed in FIG. 1 can be applied with a similar method.

Figure 2:
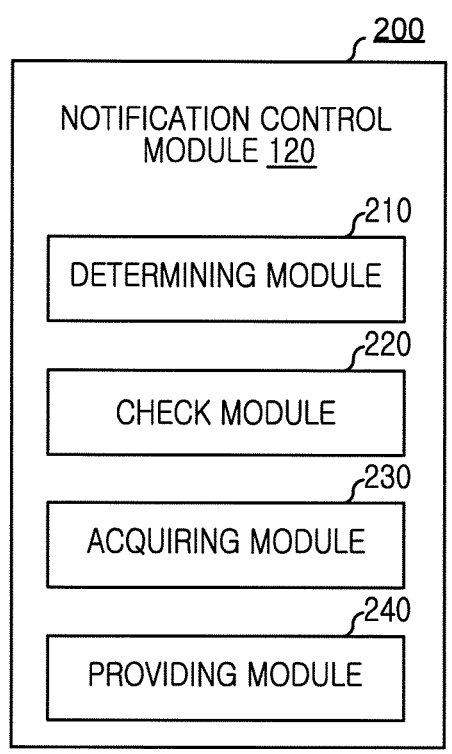
FIG. 2 is a block diagram illustrating a notification control module of an electronic device according to various embodiments of the present invention.

FIG. 2 is a block diagram illustrating the notification control module 120 of the electronic device 101 according to various embodiments of the present invention.

Referring to FIG. 2, the notification control module 120 can include at least one of a determining module 210, a check module 220, an acquiring module 230, and a providing module 240.

Hereinafter, various embodiments of each module will be described.

The determining module 210 can determine notification information to provide to the user. According to an embodiment, the determining module 210 can determine notification information about some event of events acquired in the electronic device 101 as notification information to provide to the user. For example, the electronic device 101 can determine whether the user checks notification information related to at least one event. The electronic device 101 can determine notification information related to an event in which the user does not check as notification information to provide. The event can include, for example, a phone reception event, a message reception event, an alarm event, or a social network service (SNS) event.

According to an embodiment, the determining module 210 can determine whether to output notification of an event (e.g., data) received in the electronic device 101 through the input and output interface 140 or the display 150. When the electronic device 101 determines notification information to provide through the determining module 210, the electronic device 101 can detect at least one another electronic device (e.g., the electronic device 102 and the electronic device 104) that can be connected to the electronic device 101 through the check module 220.

According to an embodiment, the check module 220 can acquire information about another electronic device having a history at least one time connected to the electronic device 101 and search for at least one another electronic device that can connect communication through the communication interface 170 of the electronic device 101 with another method.

The acquiring module 230 can acquire status information related to at least one of the electronic device 101 or at least one another electronic device (e.g., the electronic device 102, the electronic device 104, and the server 164) communicating with the electronic device 101. According to an embodiment, status information can include information that determines whether the user uses each of the electronic device 101 or another electronic device. For example, the acquiring module 230 can acquire information about whether the electronic device 101 or another electronic device is in an enabling status or a disabling status. According to an embodiment, when the electronic device 101 is in an enabling status, it can be determined that the user uses the electronic device 101. For example, it can be determined whether each of the electronic device 101 or another electronic device is in an enabling status or a disenabling status through an operation status of a display functionally connected to each of the electronic device 101 or another electronic device. For example, when a display functionally connected to the electronic device 101 is turned on, it can be determined that the electronic device 101 is in an enabling status. Further, for example, status information of the electronic device 101 or another electronic device can include status information about the user. The status information on the user can include information detected through at least one of sensors such as a touch sensor, a grip sensor, a motion sensor (e.g., an acceleration sensor, an gyro sensor), an image sensor, a proximity detection sensor, a microphone, a living body detection sensor (fingerprint detection sensor, vein detection sensor, temperature sensor), and an image sensor (e.g., a sight line recognition sensor) functionally connected to the electronic device 101 or another electronic device. Further, the acquiring module 230 can acquire information about a communication state with at least one another electronic device connected to the electronic device 101 or at least one communication method that can be connected to another electronic device 102 as the status information about the electronic device 101 or another electronic device.

For example, when a motion sensor functionally connected to the electronic device 101 detects a motion of the electronic device 101, it can be determined that the user uses the electronic device 101. Further, for example, when a touch sensor functionally connected to the electronic device 101 detects a user input, it can be determined that the user uses the electronic device 101. Further, for example, the user's sight line can be detected through an image sensor that can recognize a sight line functionally connected to the electronic device 101. When the user's sight line is detected in the electronic device 101, it can be determined that the user uses the electronic device 101. Further, for example, the electronic device 101 is a wearable device, and when it is detected that the user wears the electronic device 101 through a grip sensor and a proximity detection sensor functionally connected to the electronic device 101, it can be determined that the user uses the electronic device 101.

According to an embodiment, the status information can include attribute information of an application executing in the electronic device 101 or another electronic device. For example, attribute information of an application can include information about whether to provide notification information while executing an application. According to an embodiment, the status information can include power source status information or load information of the electronic device 101 or another electronic device.

According to an embodiment, the status information can include attribute information of notification information. For example, attribute information of notification information can include priority information about notification information. For example, attribute information of notification information can include information on whether an event occurs and time information consumed to provide notification information related to the event. For example, attribute information of notification information related to a phone event can be designated as an event that should be provided in real time. According to an embodiment, the status information can include designated information. For example, an electronic device to provide notification information can be designated according to a designated time or a designated location. For example, at a work time, it can be set to receive notification information through another electronic device connected to an electronic device, and at a time other than a work time, it can be set to receive notification information through an electronic device. Further, for example, in a vehicle, it can be set to receive notification information through another electronic device connected to an electronic device, and at a home, it can be set to receive notification information through an electronic device. According to an embodiment, the status information can include distance information or communication information between the electronic device 101 and another electronic device.

According to an embodiment, the acquiring module 230 can acquire at least one information of the foregoing status information or a combination thereof.

The providing module 240 can determine at least one device to provide notification information related to an event that has occurred in the electronic device 101 of the electronic device 101 or other electronic devices communicating with the electronic device 101 based on the status information acquired through the acquiring module 230 in an embodiment. The providing module 240 can control to provide notification information through the electronic device 101 or another electronic device based on the determined result. For example, when it is determined that the user is using the electronic device 101 based on the status information acquired in the acquiring module 230, the providing module 240 can provide notification information through the electronic device 101. When it is determined that the user does not use the electronic device 101, the providing module 240 can transmit notification information to another electronic device so that another electronic device connected to the electronic device 101 provides notification information.

When the status information acquired in the electronic device 101 is attribute information of an application, for example, when it is determined that an application executing in the electronic device 101 has a priority lower than that of notification information to provide based on the status information acquired in the acquiring module 230, the providing module 240 can provide notification information through the electronic device 101. Further, when it is determined that an application executing in the electronic device 101 has a priority higher than that of notification information to provide, the providing module 240 can transmit notification information to another electronic device so that another electronic device connected to the electronic device 101 provides notification information.

When the status information acquired in the electronic device 101 is load information of the electronic device 101, for example, when a load of the electronic device 101 is lower than a designated reference (e.g., 90% of a total load that can process), the providing module 240 can provide notification information through the electronic device 101. Further, when a load of the electronic device 101 is higher than a designated reference, the providing module 240 can transmit notification information to another electronic device so that another electronic device connected to the electronic device 101 provides notification information. When the status information acquired in the electronic device 101 is power information of the electronic device 101, for example, when a battery residual quantity of the electronic device 101 is higher than a designated reference (e.g., 10% of a total battery capacity or 150 mAh), the providing module 240 can provide notification information through the electronic device 101. Further, when a battery residual quantity of the electronic device 101 is lower than a designated reference, the providing module 240 can transmit notification information to another electronic device so that another electronic device connected to the electronic device 101 provides notification information.

For example, in the status information acquired in the electronic device 101, when notification information (e.g., incoming call notification information) should be provided in real time based on attribute information of notification information, the providing module 240 can control to provide notification information through a device in which the user uses among the electronic device 101 or another electronic device connected to the electronic device 101. When it is unnecessary to provide notification information (e.g., weather information notification information) in real time based on attribute information of notification information, the providing module 240 can control to provide notification information through a device having a small load or a large battery capacity among the electronic device 101 or another electronic device. According to an embodiment, a designated reference of various information related to the electronic device 101 can be variously changed according to the user's setting, a designer's setting, or product information about the electronic device 101.

According to an embodiment, when it is determined that the providing module 240 transmits notification information to at least one another electronic device, the electronic device 101 can receive additionally or alternatively status information from each of at least one another electronic device connected to the electronic device 101, determine a device (e.g., the electronic device 102) in which a display (e.g., a touch screen) is in an on state and/or in an unlock state among at least one another electronic device using the received status information, and transmit notification that has occurred to the determined device.

Figure 3A:
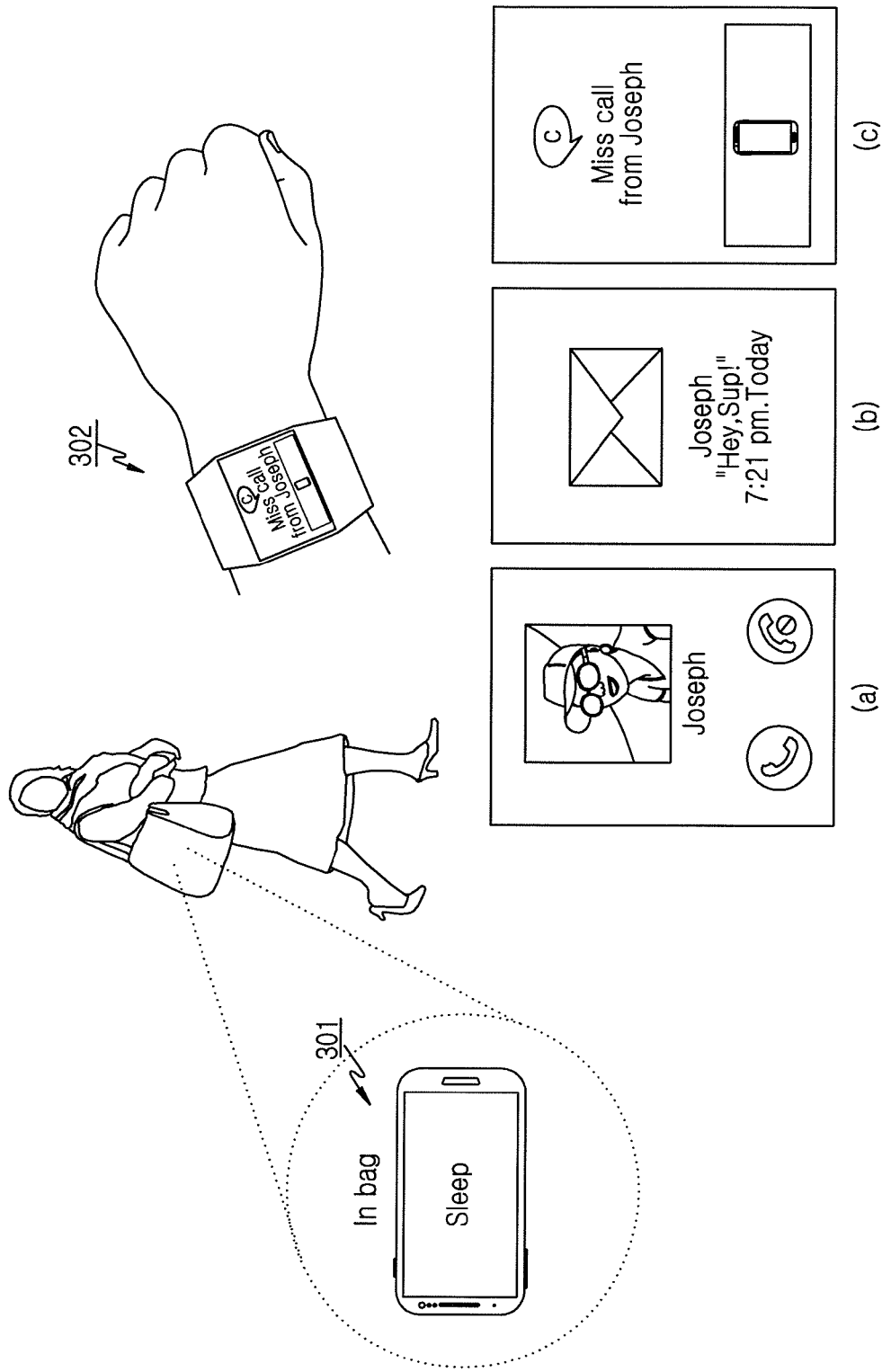
FIGS. 3A and 3B are diagrams illustrating the operations of controlling a notification information output in an electronic device according to various embodiments of the present invention.
Figure 3B:
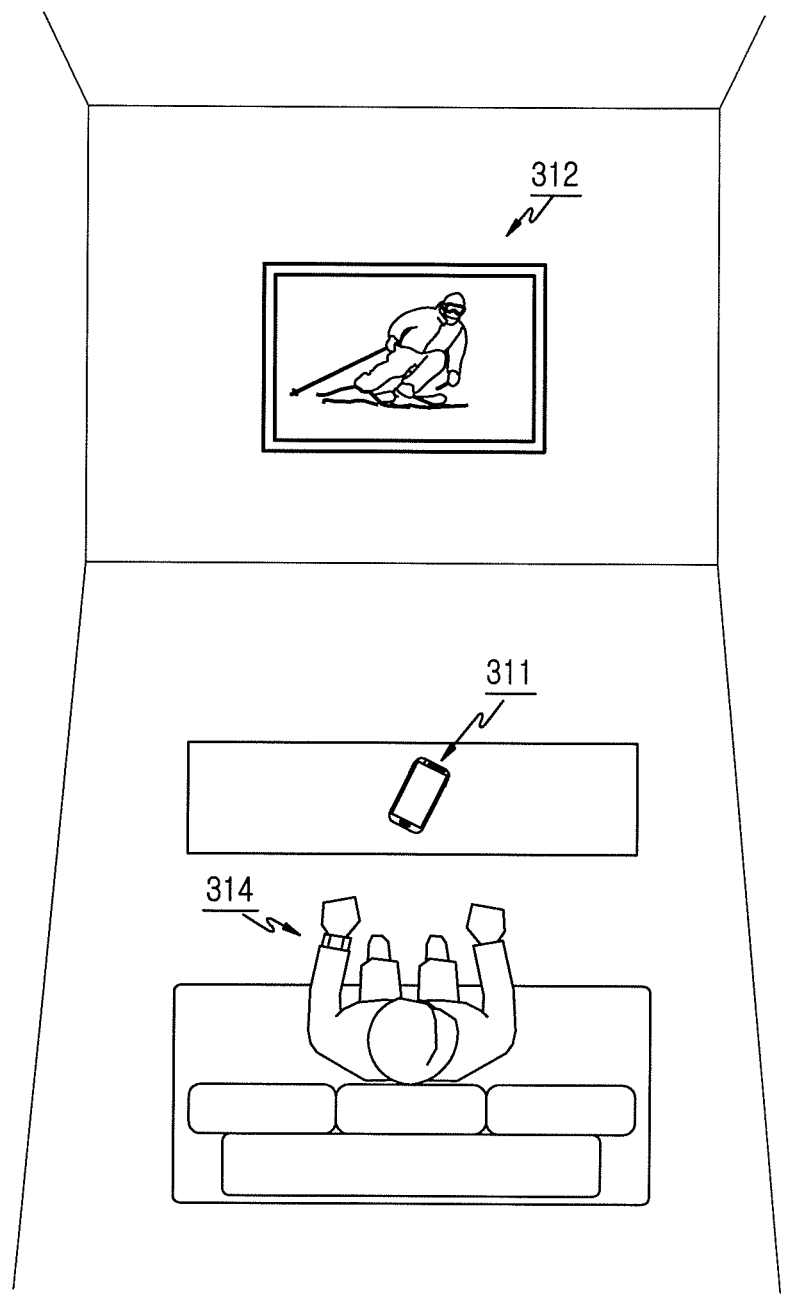

FIGS. 3A and 3B are diagrams illustrating the operation of controlling a notification information output in an electronic device according to various embodiments of the present invention.

Hereinafter, various embodiments of the present invention will be described with reference to FIG. 3A.

Referring to FIG. 3A, for example, the electronic device 101 can be represented with a first electronic device 301, and the electronic device 102 can be represented with a second electronic device 302. According to an embodiment described with reference to FIG. 3A, the first electronic device 301 can be represented with a smart phone, and the second electronic device 302 can be represented with a wearable smart watch. The first electronic device 301 and the second electronic device 302 are not limited to a smart phone or a wearable watch and can be electronic devices of various forms that can apply to various embodiments of the present invention.

The first electronic device 301 can check that an event to provide notification has occurred and output notification information. In a method of outputting notification information that has occurred, the first electronic device 301 can control the first electronic device 301 that detects that notification has occurred to output notification information or control the second electronic device 302 connected to the first electronic device 301 to output notification information.

According to an embodiment, the first electronic device 301 can detect an event to provide notification. The event to provide notification can include calling information, Short Message Service (SMS) information, missed call information, and alarm information of a notification function in which the first electronic device 301 receives.

At a time point that detects an event to provide notification, when the first electronic device 301 is in a disabling status (e.g., a sleep mode), the first electronic device 301 can transmit notification information that has occurred in the first electronic device 301 so that another electronic device (e.g., the second electronic device 302) connected to the first electronic device 301 outputs the notification information. In order for the first electronic device 301 to transmit notification information that has occurred to another electronic device (e.g., the second electronic device 302), the first electronic device 301 can check, for example, at least one another electronic device connected to the first electronic device 301. According to an embodiment, in order for the first electronic device 301 to transmit notification information that has occurred to another electronic device (e.g., the second electronic device 302), the first electronic device 301 can check at least one another electronic device having a history of at least one time connection with short range wireless communication or communication using the network 162. According to an embodiment, in order for the first electronic device 301 to transmit notification information that has occurred to another electronic device (e.g., the second electronic device 302), the first electronic device 301 can determine at least one another electronic device that can connect with short range wireless communication or communication using the network 162. The first electronic device 301 can be connected to at least one determined another electronic device. For example, when a second electronic device is included in at least one determined another electronic device, the first electronic device 301 can receive status information related to the connected second electronic device 302. The status information related to the second electronic device 302 can include at least one of information (e.g., enabling information of the second electronic device 302) about whether the user uses the second electronic device 302, attribute information of an application executing in the second electronic device 302, battery residual quantity information (e.g., power information) or load information of the second electronic device 302, communication information or distance information between the second electronic device 302 and the electronic device, and the status information (e.g., at least one sensor information acquired by a sensor functionally connected to the second electronic device 302) of the user of the second electronic device 302.

The first electronic device 301 can determine at least one device to output notification based on a designated priority according to the received status information of the second electronic device 302 or an importance level designated to an element included in the status information. According to an embodiment, the first electronic device 301 can include at least one processor. When the first electronic device 301 includes a plurality of processors, the plurality of processors can include an application processor (AP) or a communication processor (CP). The AP or the CP can be independently formed as each processor or can be included in one processor. The AP can be an application of the first electronic device 301 or a processor that controls the operation of at least one partial device (or a module) constituting the first electronic device 301, and the CP can be a processor that transmits and receives information to and from the second electronic device 302 through short range wireless communication or communication using the network 162. When the first electronic device 301 detects information about an event to provide notification received from an external device (e.g., the server 164) through the CP, the first electronic device 301 can determine an operation status of the AP that controls operation of outputting notification. When it is determined that the AP is in a disabling status (e.g., a sleep mode), the first electronic device 301 can control to output notification information through at least one another electronic device (e.g., the second electronic device 302) connected to the first electronic device 301 instead of outputting notification information through the first electronic device 301. Here, in an embodiment of a sleep mode, when a current amount or a power amount in which the device consumes is a designated numerical value (e.g., 20 mW or less), and it can be determined that a current consumed amount or a power consumed amount of the same level is maintained. In this case, the first electronic device 301 can transmit notification information to at least one other electronic device, for example, so as to output alarm information from at least one other electronic device through the CP instead of controlling operations of the AP. According to an embodiment, the first electronic device 301 can detect an event to provide notification and check a connection status of another electronic device (e.g., the second electronic device 302) designated to a top priority according to the status information of the first electronic device 301 or information stored at a database. The first electronic device 301 can check that the second electronic device 302 is connected and transmit notification information to the second electronic device 302.

According to various embodiments, the first electronic device 301 can have authority that can control operations of the second electronic device 302. In this case, the first electronic device 301 can transmit notification information including an instruction that controls the second electronic device 302 to output notification of the first electronic device 301 to the second electronic device 302. The second electronic device 302 can receive notification information from the first electronic device 301 and output notification according to notification information. According to an embodiment, the first electronic device 301 can receive a calling request from 'Joseph'. When the AP of the first electronic device 301 is in a disabling status at a calling request reception time point with reference to the status information or a database, the first electronic device 301 can determine at least one device for outputting received calling information among other electronic devices including the second electronic device 302 that can output calling request information received from 'Joseph'. For example, the first electronic device 301 can transmit phone connection request information received from 'Joseph' to the second electronic device 302 determined to output notification information. The second electronic device 302 can output calling request information as illustrated in FIG. 3A, according to the received information, and when a communication connection icon is selected in the second electronic device, a user of the second electronic device can perform a phone connection with 'Joseph'.

According to an embodiment, the first electronic device 301 can receive a text (character) message from 'Joseph'. When the AP of the first electronic device 301 is in a disabling status at a text message reception time point with reference to the status information or a database, the first electronic device 301 can determine at least one device for outputting message information among other electronic devices including the second electronic device 302 that can output text message information received from 'Joseph'. The first electronic device 301 can transmit text message information received from 'Joseph' to the second electronic device 302 determined to output notification information. The second electronic device 302 can output text message information (FIG. 3A(b)) according to received information, and the user of the second electronic device can check a text message in the second electronic device 302 through a designated operation (e.g., selection of a message check icon output to the display 150 of the second electronic device 302).

According to an embodiment, the first electronic device 301 can detect missed call information according to a phone connection received from 'Joseph'. When the AP of the first electronic device 301 is in a disabling status at a time point that detects missed call information with reference to the status information or a database, the first electronic device 301 can determine at least one device for providing missed call information among other electronic devices including the second electronic device 302 that can output missed call information received from 'Joseph'. The first electronic device 301 can transmit missed call information received from 'Joseph' to the second electronic device 302 determined to output notification information. The second electronic device 302 can output missed call information as illustrated in (c) of FIG. 3A, according to received information and can request a phone connection from the second electronic device 302 to the electronic device of 'Joseph' through the communication interface 170 of the first electronic device 301 with a designated operation (e.g., selection of a calling request icon output to the display 150 of the second electronic device 302). According to various embodiments, an event to provide notification that controls the first electronic device 301 to output from the second electronic device 302 is not limited to embodiments described in FIG. 3A, and various embodiments of similar methods can be applied thereto.

Hereinafter, various embodiments of the present invention will be described with reference to FIG. 3B.

Referring to FIG. 3B, for example, the electronic device 101 can be represented with a first electronic device 311, the electronic device 102 can be represented with a second electronic device 312, and the same electronic device as the electronic device 104 or the electronic device 102 or an electronic device similar to the electronic device 104 or the electronic device 102 can be represented with a third electronic device 314. Hereinafter, when describing an embodiment of the present invention, the second electronic device 312 can be applied to the electronic device 104 and the third electronic device 314 can be applied to the same electronic device as the electronic device 102 or an electronic device similar to the electronic device 102. In an embodiment described with reference to FIG. 3B, for example, the first electronic device 311 can be represented with a smart phone, the second electronic device 312 can be represented with a smart television, and the third electronic device 314 can be represented with a wearable smart watch. The first electronic device 311 can check that an event to provide notification has occurred and can output notification information. In a method of outputting notification information that has occurred, the first electronic device 311, having detected notification occurrence can output notification information and the second electronic device 312 connected to the first electronic device 311 can output notification information.

According to an embodiment, the first electronic device 311 can detect an event to provide notification. When the first electronic device 311 detects an event to provide notification, the first electronic device 311 can determine whether the first electronic device 311 or the AP functionally connected to the first electronic device 311 is in a disabling status. According to an embodiment, when the first electronic device 311 or the AP is in a disabling status, for example, the display 150 of the first electronic device 311 can be in an off state or the AP can be in a sleep mode status. When the first electronic device 311 is in a disabling status, the first electronic device 311 (e.g., the providing module 240) can determine so that another electronic device (e.g., the second electronic device 312 or the third electronic device 314 connected to the first electronic device 311) outputs notification information that has occurred in the first electronic device 311. In order to transmit notification information that has occurred, the first electronic device 311 can check the first electronic device 311 and another electronic device connected to, for example, the communication interface 170. Further, in order to transmit notification information that has occurred, the first electronic device 311 can check at least one another electronic device having a history connected at least one time by the communication interface 170. Further, in order to transmit notification information that has occurred, the first electronic device 311 can check another electronic device that can be connected through the communication interface 170.

The first electronic device 311 can be connected to the checked at least one another electronic device, and for example, when the second electronic device 312 and the third electronic device 314 is included in at least one another electronic device, the first electronic device 311 can receive the status information of another electronic device including the connected second electronic device 312 and third electronic device 314. The status information of the second electronic device 312 or the third electronic device 314 can include information (e.g., enabling information of the second electronic device 312 or the third electronic device 314) about whether the user uses the second electronic device 312 or the third electronic device 314, information about an operation (e.g., an application) being performed, importance level information of an operation (e.g., an application) being performed, battery residual quantity information (or power information), communication state information between the second electronic device 312 or the third electronic device 314 and an external electronic device (e.g., a first electronic device), and user information (e.g., at least one sensing information in which the second electronic device 312 or the third electronic device 314 acquires) of the second electronic device 312 or the third electronic device 314. According to an embodiment, sensing information can be information about a state of each electronic device acquired through at least one sensor included in the second electronic device 312 or the third electronic device 314. The first electronic device 311 can determine a priority according to an importance level designated to elements included in the received status information of the second electronic device 312 or the third electronic device 314 and can determine at least one another electronic device to output notification with reference to the status information and a designated priority.

According to an embodiment, the first electronic device 311 can check a connecting method of the second electronic device 312 or the third electronic device 314 connected by the communication interface 170 and can determine signal information of a connected communication method. According to an embodiment, the first electronic device 311 can determine a communication environment through signal information of a communication method of transmitting and receiving information to and from the second electronic device 312 or the third electronic device 314 and determine another electronic device to transmit notification with reference to a designated priority of an element such as stability of a communication method, an information transmitting and receiving speed of the connected communication method, or a distance that can transmit and receive according to communication signal intensity. The first electronic device 311 can determine the third electronic device 314 faster than that of the second electronic device 312 in an information transmitting and receiving speed of a connected communication method as another electronic device to transmit notification according to a designated condition and transmit output information of notification that has occurred in the first electronic device 311 to the third electronic device 314. The third electronic device 314 can output information about notification that has occurred in the first electronic device 311 according to received information.

According to an embodiment, when determining another electronic device to transmit notification, the first electronic device 311 can determine an electronic device having low real time dependence of an application executing in at least one another electronic device as a device to transmit notification. For example, the first electronic device 311 can determine an application that should execute without stopping such as a moving picture photographing application or a game application as an application having high real time dependence. Further, for example, the first electronic device 311 can determine an application that can execute after stopping such as Internet as an application having low real time dependence. According to an embodiment, the first electronic device 311 can check real time dependence of an application in which another electronic device including the second electronic device 312 and the third electronic device 314 is executing. When outputting notification information to an electronic device executing, for example, some application, real time dependence can be numerical value information of damage (e.g., data damage) that can cause when executing the application. According to an embodiment, the first electronic device 311 can use a real time dependence numerical value as information for determining an electronic device to provide notification. According to an embodiment, the first electronic device 311 can store information (e.g., real time dependence information of an application) about at least one application included in the second electronic device 312 or the third electronic device 314 at a database through the status information in which the second electronic device 312 or the third electronic device 314 receives, and the database can check information about a priority (e.g., a priority determined based on real time dependence) of an application stored at each electronic device. According to an embodiment, the first electronic device 311 can compare real time dependence information about a media data reproduction operation executing in the second electronic device 312 and real time dependence information of a recording operation of media data performing in the third electronic device 314 and can determine the second electronic device 312 executing an application having low real time dependence to output notification information. The first electronic device 311 can transmit output information of notification information that has occurred to the second electronic device 312. The second electronic device 312 can output notification information that has occurred in the first electronic device 311 according to the received information.

FIGS. 4A to 4E are diagrams illustrating the operations of controlling a notification information output in an electronic device according to various embodiments of the present invention.

Referring to FIGS. 4A to 4E, for example, the electronic device 101 can be represented with a first electronic device 401, and the electronic device 102 can be a second electronic device 402. According to an embodiment, the first electronic device 401 can be represented with a smart phone, and the second electronic device 402 can be represented with a wearable smart watch.

Hereinafter, various embodiments of the present invention will be described with reference to FIG. 4A.

Figure 4A:
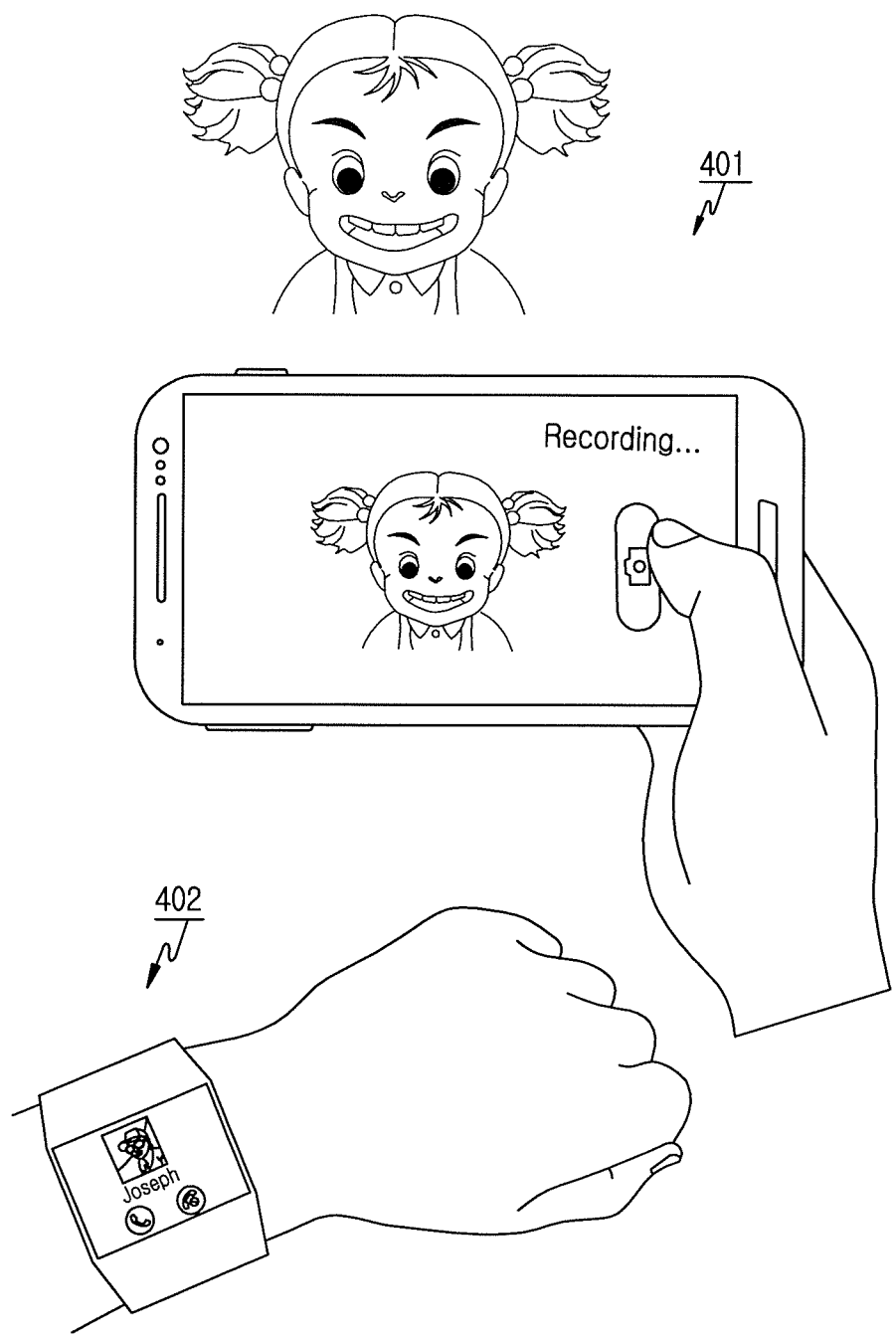
FIGS. 4A to 4E are diagrams illustrating the operations of controlling a notification information output in an electronic device according to various embodiments of the present invention.

Referring to FIG. 4A, while executing at least one application, the first electronic device 401 can detect that an event to provide notification has occurred. The first electronic device 401 can determine whether to output notification information with reference to attribute information (e.g., real time dependence information) of at least one executing application. When it is determined that the first electronic device 401 does not output notification information, the first electronic device 401 can determine the second electronic device 402 as an electronic device to output notification information and transmit output information of the detected notification information to the determined second electronic device 402.

When the first electronic device 401 detects an event to provide notification, the first electronic device 401 can determine whether the first electronic device 401 is to output notification information. According to an embodiment, when the first electronic device 401 detects an event to provide notification information, the first electronic device 401 can acquire the status information of the first electronic device 401. When the first electronic device 401 executes at least one application at a time point that detects an event to provide notification, the first electronic device 401 can determine whether at least one executing application is an application designated to display notification. According to an embodiment, while recording media data, the first electronic device 401 can receive a calling request from 'Joseph'. When a calling request event occurs while media data recording with reference to, for example, a database of an executing media data recording application or a database for processing an event to provide notification that has occurred in the first electronic device 401, the first electronic device 401 can determine whether the first electronic device 401 is set to output notification about a calling request. When the first electronic device 401 is set to not display notification of a calling request event that has occurred while media data recording, the first electronic device 401 can control another electronic device to output information about a calling request that has occurred. The first electronic device 401 can check at least one another electronic device that can connect through the communication interface 170. The first electronic device 401 can receive the status information from at least one connected another electronic device and select at least one another electronic device to transmit notification information with reference to the status information. According to an embodiment, the first electronic device 401 in a wearing the status and that is not in a maximum power saving mode or a sleep mode (e.g., a disabling status) can be designated to have a high priority to be determined as a device to provide notification at a database. When the first electronic device 401 checks that the second electronic device 402 is in a wearing status and is not in a sleep mode status through the status information received from the second electronic device 402, the first electronic device 401 can transmit notification information about a calling request received from 'Joseph' to the second electronic device 402 based on database information, and the second electronic device 402 can output notification according to received information.

According to another embodiment, the first electronic device 401 can detect an alarm event output while executing a navigation application. The first electronic device 401 can determine whether the first electronic device 401 is set to output notification about an alarm event output while executing a navigation application with reference to a database of the executing navigation application or a database for processing an event to provide notification that has occurred in the first electronic device 401. When the first electronic device 401 is set to not display notification about an alarm event output that has occurred while executing a navigation application, the first electronic device 401 can control another electronic device to output information about an alarm event that has occurred. The first electronic device 401 can check at least one another electronic device that can connect through the communication interface 170. The first electronic device 401 can receive the status information from at least one connected another electronic device and select at least one another electronic device to transmit notification information with reference to the status information. According to an embodiment, a wearing electronic device that is not in a state such as a maximum power saving mode or a sleep mode can be designated to have a high priority to be determined as an electronic device to provide notification at a database of the first electronic device 401. When the first electronic device 401 checks that the second electronic device 402 is in a wearing status and is not in a sleep mode status through the status information received from the second electronic device 402, the first electronic device 401 can transmit notification information of an alarm event that has occurred to the second electronic device 402 based on database information, and the second electronic device 402 can output alarm according to received information.

According to various embodiments, the first electronic device 401 can determine whether the first electronic device 401 is to output information about an event to provide notification that has occurred according to a checked time. According to an embodiment, the first electronic device 401 can receive a calling request from 'Joseph' while recording media data. When a calling request event occurs while media data recording with reference to a database of executing media data recording or a database for processing an event to provide notification that has occurred in the first electronic device 401, the first electronic device 401 can determine whether the first electronic device 401 is set to output notification about the calling request. When the first electronic device 401 is set (designated) not to display notification about a calling request event that has occurred in the first electronic device 401 from a time point '11:00' to a time point '14:30', the first electronic device 401 can control another electronic device to output information about a calling request event that has occurred from a time point '11:00' to a time point '14:30'. When a calling request event has occurred in the first electronic device 401 from a time point '11:00' to a time point '14:30', the first electronic device 401 can check at least one another electronic device that can output notification about the calling request event instead of the first electronic device 401. The first electronic device 401 can receive the status information from at least one connected another electronic device and select at least one another electronic device to transmit notification information with reference to the status information. According to various embodiments, when the first electronic device 401 determines at least one another electronic device to output notification about an event that has occurred, the first electronic device 401 can determine at least one another electronic device to output notification through information (designated information) about a designated range of at least one information of various status information such as location information of the first electronic device 401, illumination amount information of the first electronic device 401 or an area in which the first electronic device is located, and moving speed information of the first electronic device instead of limiting to designated time information.

Hereinafter, various embodiments of the present invention will be described with reference to FIGS. 4B and 4C.

Figures 4B, 4C:
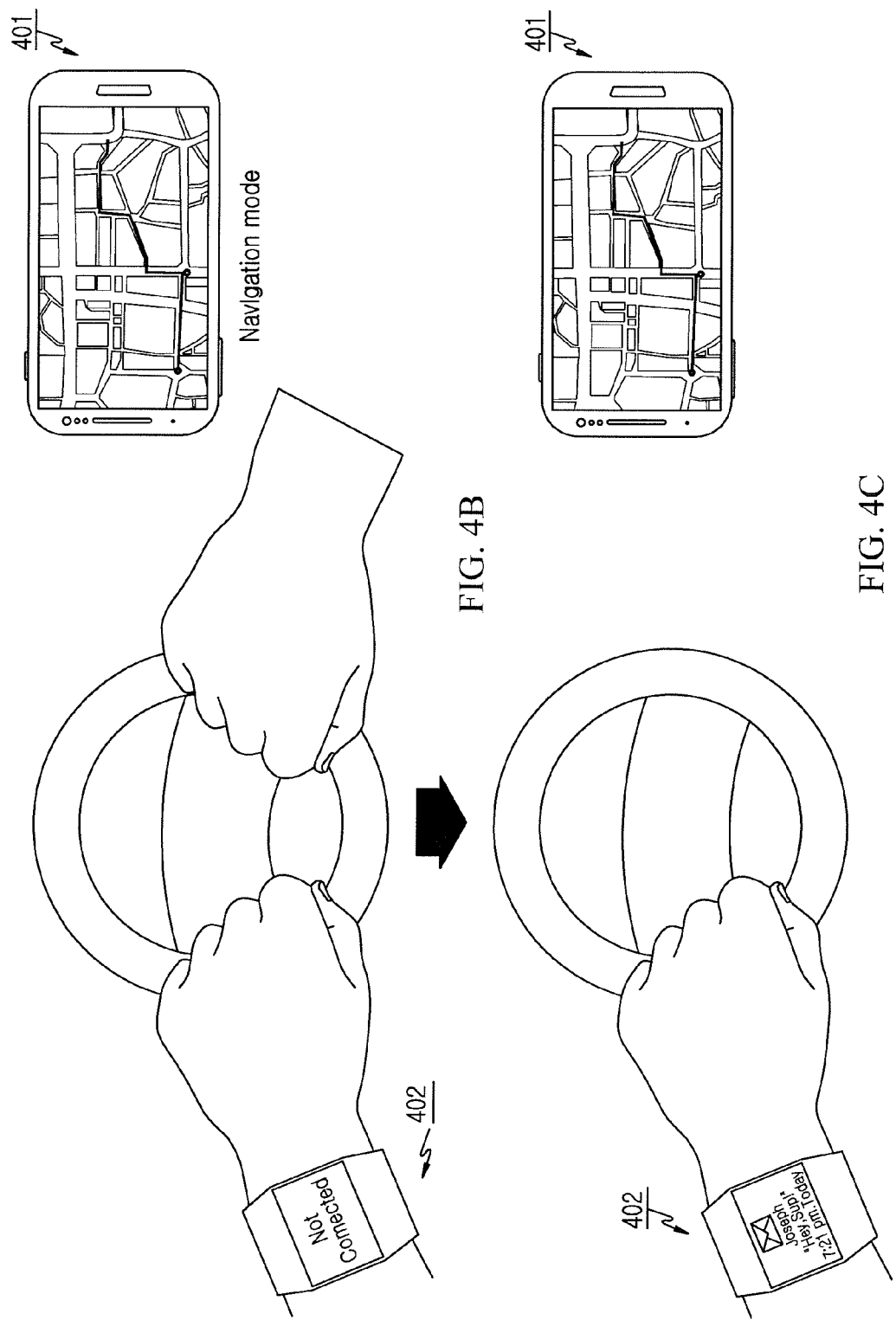

Referring to FIGS. 4B and 4C, the first electronic device 401 can detect that an event to provide notification has occurred while performing at least one operation. The first electronic device 401 can determine whether to output notification with reference to at least one executing application, and when it is determined that the first electronic device 401 does not output notification, the first electronic device 401 can determine the second electronic device 402 as an electronic device to output notification and transmit output information of detected notification to the determined second electronic device 402. When the second electronic device 402 does not check an output result of notification information according to output information of notification transmitted to the second electronic device 402, the first electronic device 401 can check importance level information about an event to provide notification that has occurred at a database, and when operation is not designated to output notification in real time, the first electronic device 401 can retransmit notification information to the second electronic device 402 or can transmit notification information to another electronic device.

According to an embodiment, the first electronic device 401 can detect message data reception while executing a navigation application. The first electronic device 401 can determine whether the first electronic device 401 is set to output notification of message data reception while executing a navigation application with reference to a database of an executing navigation application or a database for processing an event to provide notification that has occurred in the first electronic device 401. When the first electronic device 401 is set not to display notification of message reception that has occurred while executing a navigation application, the first electronic device 401 can control another electronic device to output information about message reception that has occurred. The first electronic device 401 can check at least one another electronic device that can connect through the communication interface 170. The first electronic device 401 can receive the status information from at least one connected another electronic device and select at least one another electronic device to transmit notification information with reference to the status information. According to another embodiment, when the first electronic device 401 does not check whether the second electronic device 402 outputs notification of message data, having transmitted to the second electronic device 402 or when it is determined that the second electronic device 402 does not output notification about message data, the first electronic device 401 can retransmit notification about message data to the second electronic device 402 and transmit notification information to another electronic device so that another electronic device connected to the first electronic device 401 outputs notification.

According to another embodiment, when the first electronic device 401 outputs information about message data reception determined as a priority (e.g., a priority determined based on real time dependence) lower than that of a navigation application and that has occurred while executing an application having high real time dependence such as a navigation application, if a connected another electronic device that can output notification information instead of the first electronic device 401 is not checked, the first electronic device 401 can hold the operation of outputting notification of received message data. When the first electronic device 401 checks and connects at least one another electronic device that can connect, for example, the second electronic device 402 while operating a navigation application or when the first electronic device 401 checks that the first electronic device 401 is connected to the second electronic device 402, the first electronic device 401 can transmit holding notification information about message data reception to the second electronic device 402.

Further, according to an embodiment, when outputting information about message data reception determined as having a lower priority (e.g., a priority determined based on real time dependence) than that of a navigation application and that has occurred while executing an application having a high priority (e.g., a priority determined based on real time dependence) such as a navigation application, if a connected another electronic device that can output notification information instead of the first electronic device 401 is not checked or if it is not checked that transmitted notification information about message data reception is output, the first electronic device 401 can control to terminate the navigation application and control the first electronic device 401 to output notification information about message data reception.

According to various embodiments, when the first electronic device 401 outputs information about a calling request determined as having a higher priority (e.g., a priority determined based on real time dependence) than that of a navigation application and that has occurred while executing an application having high real time dependence such as a navigation application, if a connected another electronic device that can output notification information instead of the first electronic device 401 is not checked or if it is not checked that transmitted notification information about message data reception is output, the first electronic device 401 can control the first electronic device 401 to output notification information about message data reception.

The foregoing various embodiments can be performed according to information set or stored at a database stored at the first electronic device 401 and/or a database of each application or control information set at a control module that controls an output of the notification.

Hereinafter, various embodiments of the present invention will be described with reference to FIGS. 4D and 4E.

Figure 4E:
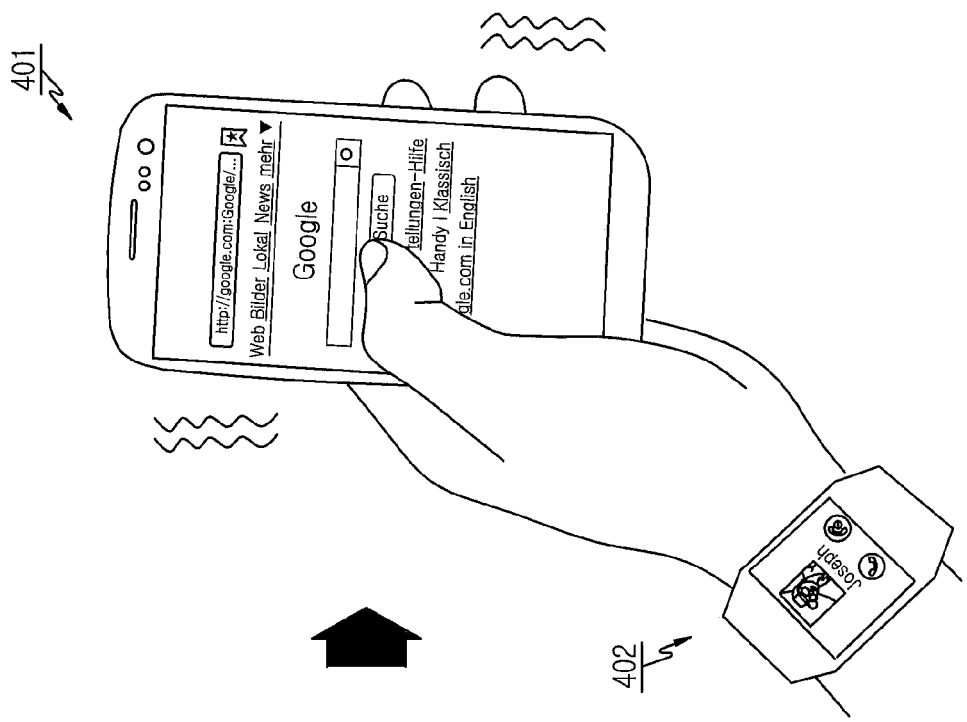
Figure 4D:
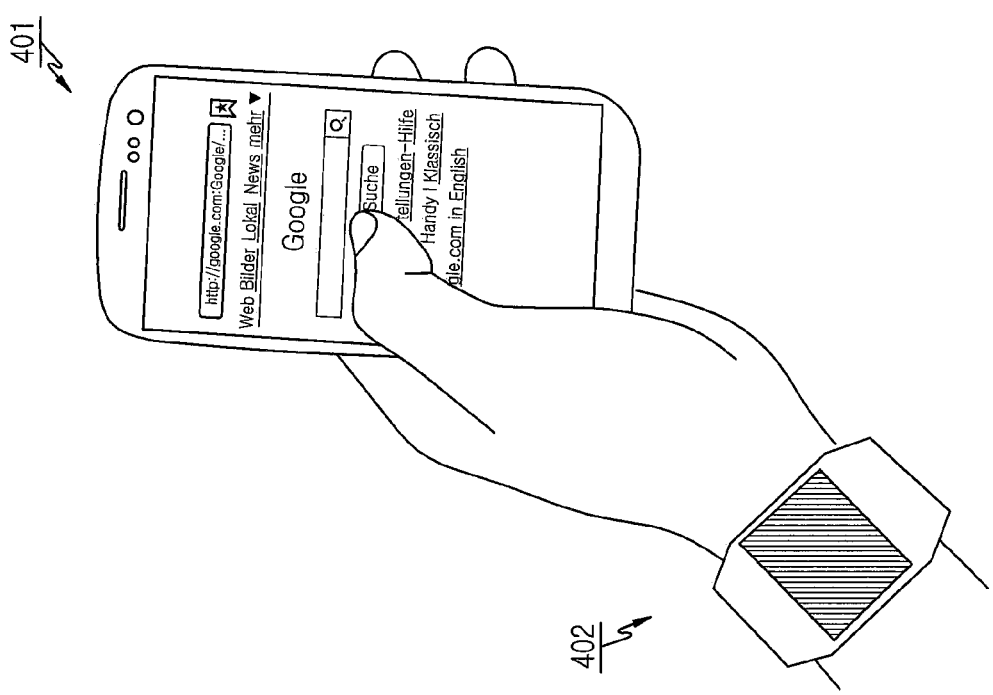

Referring to FIGS. 4D and 4E, while executing at least one operation (e.g., application), the first electronic device 401 can detect that an event to provide notification has occurred. The first electronic device 401 can determine whether to output notification with reference to at least one operation being performed, and when it is determined that the first electronic device 401 does not output notification, the first electronic device 401 can determine the second electronic device 402 as an electronic device to output notification, and the first electronic device 401 can transmit output information of the detected notification to the determined second electronic device 402.

According to an embodiment, the first electronic device 401 can receive a calling request from 'Joseph' while performing a large capacity data processing such as an on-line system updating operation. The first electronic device 401 can determine whether the first electronic device 401 is set to output notification of calling request reception while performing an on-line system updating operation with reference to a database for processing an event to provide notification that has occurred in the first electronic device 401. When the first electronic device 401 is set not to display notification of a calling request that has occurred while an on-line system updating operation, the first electronic device 401 can control another electronic device to output information about a calling request that has occurred. The first electronic device 401 can determine the second electronic device 402 having a few data load in at least one connected another electronic device to output information about a calling request that has occurred in the first electronic device 401 and transmit notification information about a calling request to the second electronic device 402. The first electronic device 401 can enable the first electronic device 401 to perform operations such as a sound or a vibration together with the operation of transmitting notification information about a calling request to the second electronic device 402, enable the display 150 of the first electronic device 401 to output information about notification information transmission, and to perform a combined operation of at least two operations of a sound, a vibration, and the operation of outputting to the display.

Figure 5A:
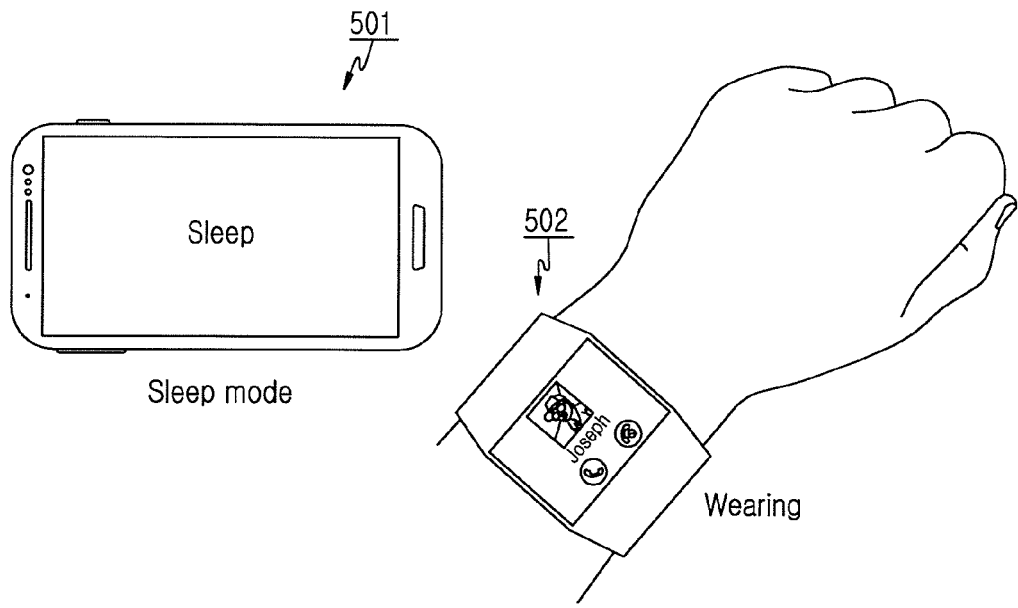
FIGS. 5A and 5D are diagrams illustrating the operations of controlling a notification information output in an electronic device according to various embodiments of the present invention.
Figure 5B:
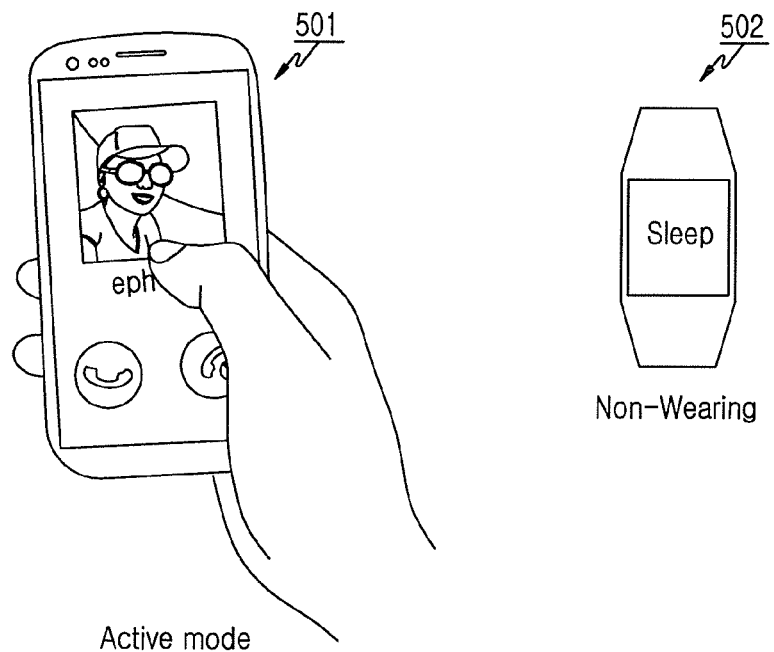
Figure 5C:
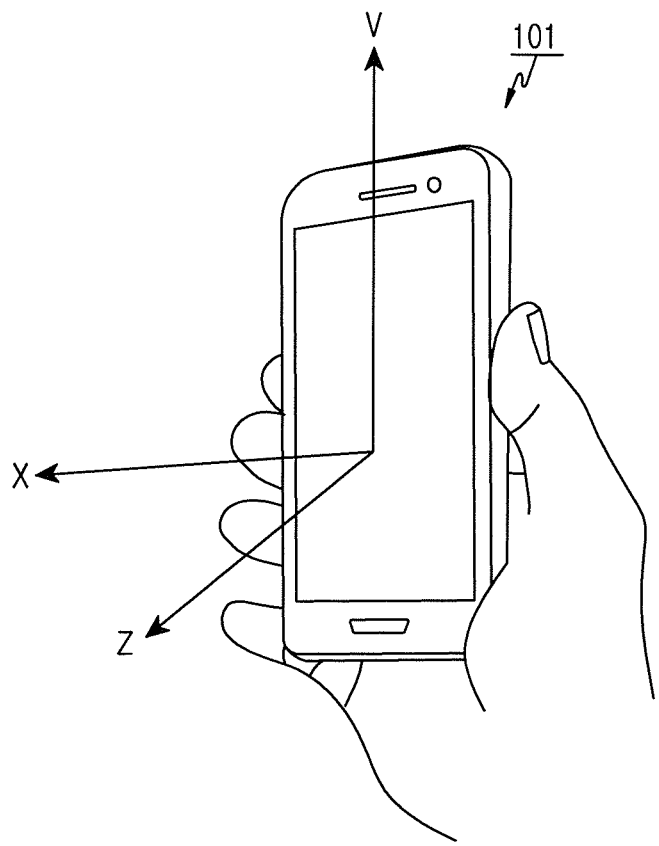
Figure 5D:
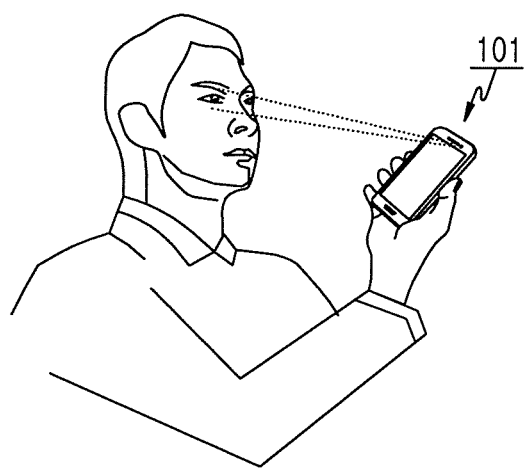

FIGS. 5A and 5D are diagrams illustrating the operation of controlling a notification information output in an electronic device according to various embodiments of the present invention.

Hereinafter, various embodiments of the present invention will be described with reference to FIG. 5A.

Referring to FIG. 5A, for example, the electronic device 101 can be represented with a first electronic device 501, and the electronic device 102 can be represented with a second electronic device 502. According to an embodiment, the first electronic device 501 can be represented with a smart phone, and the second electronic device 502 can be represented with a wearable smart watch.

Referring to FIG. 5A, when the first electronic device 501 detects an event to provide notification, the first electronic device 501 can acquire the status information of the first electronic device 501 and the status information of the connected second electronic device 502 and determine at least one electronic device that outputs information about an event to provide notification that has occurred in the first electronic device 501 according to a state of the first electronic device 501 and the second electronic device 502.

According to an embodiment, the first electronic device 501 can receive a calling request from 'Joseph', which is an event to provide notification and acquire the status information of the first electronic device 501. The first electronic device 501 can receive a calling request from 'Joseph' through the CP and determine (or check) that the AP is in a sleep mode status. The first electronic device 501 can determine not to output notification of a calling request that has occurred, when the AP is in a sleep mode but determine the second electronic device 502 to output notification. The first electronic device 501 can acquire the status information from the connected second electronic device 502. The first electronic device 501 can check that the second electronic device 502 is in a wearing status from the acquired status information of the second electronic device 502 and transmit notification information about a calling request to the second electronic device 502 so that the wearing second electronic device 502 outputs information about a calling request that has occurred in the first electronic device 501. Further, the first electronic device 501 or the second electronic device 502 can determine a distance between the first electronic device 501 and the second electronic device 502 through at least one device that can determine a proximity status, such as a proximity detection sensor or a communication module (e.g., an NFC module, a Wifi module, and a Bluetooth (BT) module). When it is determined that the second electronic device 502 is located within a designated distance from the first electronic device 501, the first electronic device 501 can determine so that the second electronic device 502 outputs notification. According to an embodiment, when the first electronic device 501 receives a calling request according to information stored at a database, the first electronic device 501 can check a status of the AP. When the AP of the first electronic device 501 is in a sleep mode, the first electronic device 501 can acquire the status information about at least one connected another electronic device. When it is determined (or checked) that the wearable second electronic device 502 is in a wearing status through the acquired status information and in a state tagged with the first electronic device 501 (a state in which the first electronic device 501 and the second electronic device 502 are located within a designated distance range) through an NFC communication module, the first electronic device 501 can determine the second electronic device 502 to output notification of the received calling request and transmit notification information about a calling request to the second electronic device 502.

According to another embodiment, when the first electronic device 501 receives message data while performing an audio dedicated communication operation, the first electronic device 501 can determine another electronic device to output notification information about message information in which the first electronic device 501 receives according to information stored at a database. The first electronic device 501 can acquire the status information about at least one connected another electronic device. The first electronic device 501 can detect that the wearable second electronic device 502 is in a wearable status through the acquired status information and detect Bluetooth communication signal intensity of the first electronic device 501 in the second electronic device 502 through Bluetooth communication, and when Bluetooth communication signal intensity is in a designated range (when a distance range between the first electronic device 501 and the second electronic device 502 determined as communication signal intensity is within a designated distance range), the first electronic device 501 can determine the second electronic device 502 to output notification of the received message data and transmit notification information about message data to the second electronic device 502.

Referring to FIG. 5B, when the first electronic device 501 receives a calling request in a standby mode status or while performing operations such as Internet surfing in which a priority (e.g., a priority determined based on real time dependence) is not high, the first electronic device 501 can determine the first electronic device 501 to output notification of a calling request with reference to information stored at, for example, a database. Connected another electronic device can be a second electronic device 502, and the second electronic device 502 can receive the status information. The first electronic device 501 can check that the wearable second electronic device 502 is not in a wearing status and/or is in a sleep mode status through the status information of the second electronic device 502. When the connected second electronic device 502 is not in a wearing status and/or operates in a sleep mode status, the first electronic device 501 may not process the second electronic device 502 to output notification information about a calling request in which the first electronic device 501 receives but process the first electronic device 501 to output notification information.

Hereinafter, various embodiments of the present invention will be described with reference to FIGS. 5C and 5D.

Referring to FIGS. 5C and 5D, when the electronic device 101 detects occurrence of an event to provide notification, when determining whether the electronic device 101 is to output corresponding notification, the electronic device 101 can determine the electronic device 101 to output notification through information that is set at, for example, a database stored at the electronic device 101 or a database of an application performing in the electronic device 101 at a time point in which an event to provide notification has occurred. When determining whether to display notification of the operation that has occurred, the electronic device 101 can refer to the status information of the electronic device 101.

Referring to FIG. 5D, for example, when the electronic device 101 detects an event to provide notification in the electronic device 101, in a method of determining whether the electronic device 101 is to output corresponding notification, the electronic device 101 can refer to at least one information of a state, a location and/or a motion of the electronic device 101 determined through information measured through at least one sensor in which the electronic device 101 includes.

According to an embodiment, the electronic device 101 can acquire information about a coordinate (two-dimension or three-dimension) that determines a motion of the electronic device 101 in which the electronic device 101 locates through a gyro sensor at a time point that detects an event to provide notification, and when the acquired coordinate is included in a range of a motion that determines the electronic device 101 to output notification stored at a database of the electronic device 101, the electronic device 101 can output notification.

According to another embodiment, the electronic device 101 can acquire information about a space coordinate (e.g., a GPS coordinate) at which the electronic device 101 locates at a time point that detects an event to provide notification through a GPS functionally connected to the electronic device, and when information about the acquired coordinate is included in a range of a coordinate that determines the electronic device 101 to output notification stored at a database of the electronic device 101, the electronic device 101 can output notification.

According to another embodiment, the electronic device 101 can acquire information about a speed in which the electronic device 101 moves at a time point that detects an event to provide notification through an acceleration sensor, and when information about the acquired speed is included in a range of a speed that determines the electronic device 101 to output notification stored at a database of the electronic device 101, the electronic device 101 can output notification.

Referring to FIG. 5D, when the electronic device 101 detects an event to provide notification in a state of performing at least one function, in a method of determining whether the electronic device 101 is to output corresponding notification, the electronic device 101 can refer to at least one information of a state, a location and/or a motion of the electronic device 101 determined through information measured through at least one sensor in which the electronic device 101 includes.

According to an embodiment, the electronic device 101 can detect occurrence of an event to provide notification while controlling a document displayed in the display 150 of the electronic device 101 through a pupil detection sensor (e.g., an image sensor). When the electronic device 101 detects a pupil through a pupil detection sensor, the electronic device 101 determines that the user controls the electronic device 101 and the electronic device 101 can display notification of an event that has occurred in the electronic device 101 through the electronic device 101.

The electronic device 101 can compare information acquired by at least one sensor of various sensors in which the electronic device 101 includes and information stored at a database and determine whether the electronic device 101 or at least one another electronic device is to output notification of an event to provide notification that has occurred in the electronic device 101 without limiting to the foregoing embodiment. Further, the foregoing various embodiments can be performed according to information set or stored at a database stored at the electronic device 101 and/or a database of each application, or control information set at a control module that controls an output of the notification.

Figure 6:
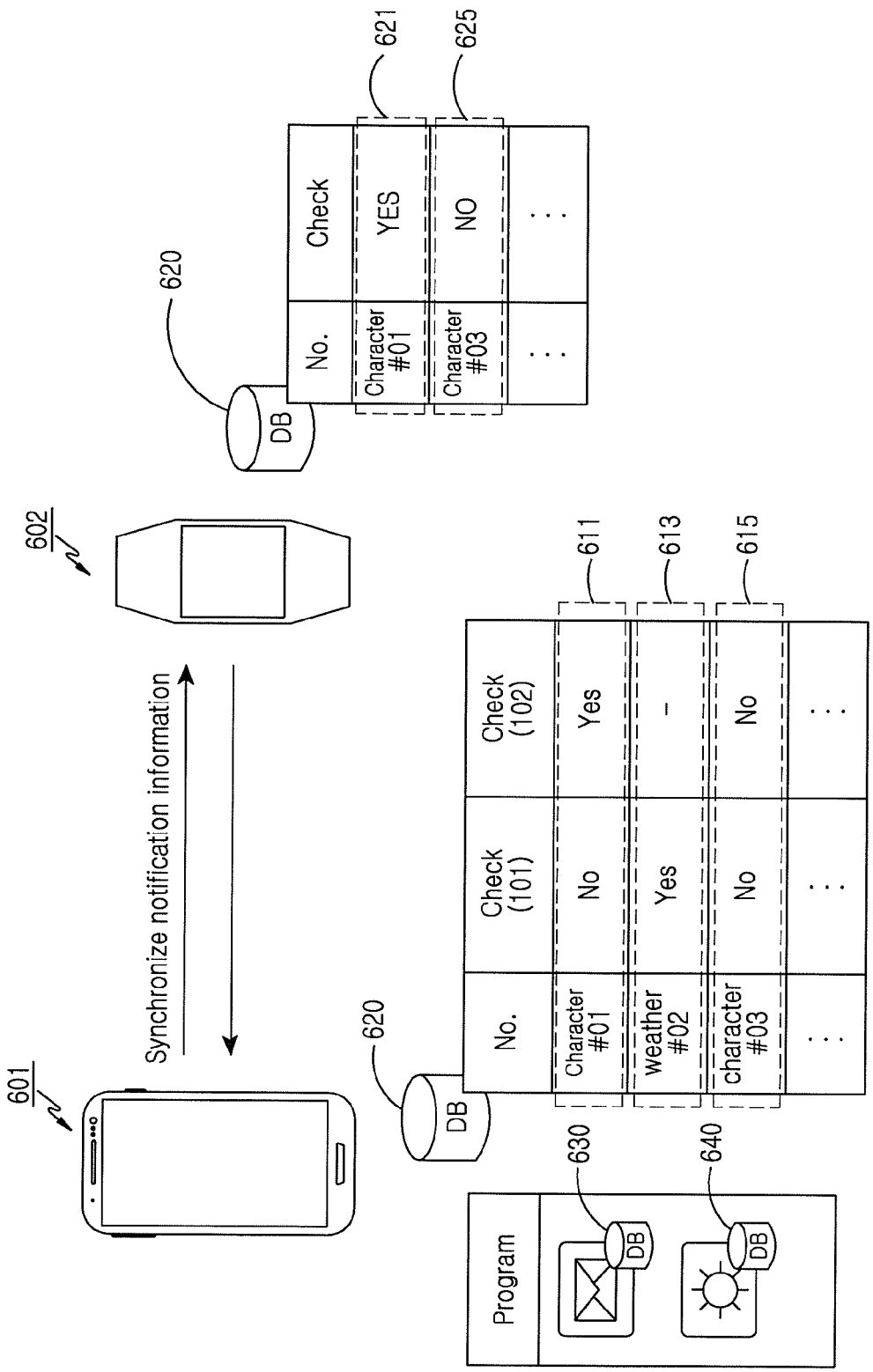
FIG. 6 is a diagram illustrating the operations of processing notification information in an electronic device according to various embodiments of the present invention.

FIG. 6 is a diagram illustrating the operation of processing notification information in an electronic device according to various embodiments of the present invention.

Referring to FIG. 6, for example, the electronic device 101 can be represented with a first electronic device 601 and the electronic device 102 can be represented with a second electronic device 602. According to an embodiment, the first electronic device 601 can be represented with a smart phone, and the second electronic device 602 can be represented with a wearable smart watch.

When the first electronic device 601 detects that an event to provide notification occurs, the first electronic device 601 can process the first electronic device 601 or at least one another electronic device to output notification information about an event that has occurred. The first electronic device 601 can process the first electronic device 601 or the second electronic device 602 to output notification about an event that has occurred and acquire information about an event notification output from the second electronic device 602. The first electronic device 601 can determine whether an event that has occurred in the first electronic device 601 has been checked through information about an event notification output received in the second electronic device 602. The first electronic device 601 can synchronize information on whether an event that has occurred has been checked with recorded information of an event occurred at the first electronic device 601 or a database of an application connected to an event. When it is determined that an event that has occurred is not check in the first electronic device 601 or at least one another electronic device (e.g., the second electronic device 602) that transmits notification information so as to output notification about an event, the first electronic device 601 can output or re-output notification about a corresponding event or can transmit notification information about an event to the second electronic device 602 so that the connected second electronic device 602 outputs or re-outputs.

According to an embodiment, in order to enable the second electronic device 602 to display notification information about a received 'character #01' and 'character #03', the first electronic device 601 can transmit notification information about the 'character #01' and notification information about the 'character #03' to the second electronic device 602. The first electronic device 601 can store information about the 'character #01' and the 'character #03' transmitted to the second electronic device 602 (notification information transmitted to the second electronic device 602) and information 611, 615, 621, and 625 (information about notification check) about a state in which the 'character #01' and the 'character #03' are not checked at a database 620 of the first electronic device 601 and/or a database 630 of a character application connected to 'character #01' data 'character #03' data.

According to an embodiment, the first electronic device 601 can check whether the first electronic device 601 has been transmitted notification information (e.g., the 'character #01' and the 'character #03') to another electronic device (e.g., the second electronic device 602). When the first electronic device 601 does not transmit notification information, the first electronic device 601 can determine whether the user of the first electronic device 601 checks notification information. If the user of the first electronic device 601 does not check notification information, the first electronic device 601 can designate the notification information as non-transmission notification at the database 620 of the first electronic device 601 or a character application database 630. Additionally or alternatively, the first electronic device 601 can transmit notification information designated as non-transmission notification to another electronic device (e.g., the second electronic device 602).

For example, when the first electronic device 601 does not transmit a 'character #01' and a 'character #02 to the second electronic device 602, the first electronic device 601 can check that the user of the first electronic device 601 does not check the 'character #01' and the 'character #02' based on information 611 on whether the 'character #01' and the 'character #02' are checked. In this case, the first electronic device 601 can transmit the 'character #01' and the 'character #02' to the second electronic device 602 communicating with the first electronic device 601.

The second electronic device 602 can output notification information about the 'character #01' in which the first electronic device 601 receives and notification information about the 'character #03' and store information on whether the 'character #01' has been checked and information on whether the 'character #03' has been checked at a database 620 of the second electronic device 602 and/or a database (not shown) of a character application of the second electronic device 602. The second electronic device 602 can transmit information of the database 620 in which information 621 on whether the 'character #01' has been checked and information 625 on whether the 'character #03' has been checked is stored to the first electronic device 601. When the second electronic device 602 is not connected to the first electronic device 601 through the communication interface 170, the second electronic device 602 can hold transmission of the information 621 of the database 620 on whether the 'character #01 has been checked and the information 625 on whether the 'character #03' has been checked, and at a time point at which the second electronic device 602 is connected to the first electronic device 601, the second electronic device 602 can transmit the information 621 of the database 620 on whether the 'character #01 has been checked and the information 625 on whether the 'character #03' has been checked to the first electronic device 601. Alternatively, the second electronic device 602 can include and transmit the information 621 on whether the 'character #01 has been checked and the information 625 on whether the 'character #03' has been checked in the status information transmitting to the first electronic device 601.

The first electronic device 601 can combine the information 621 on whether the 'character #01 has been checked and the information 625 on whether the 'character #03' has been checked received from the second electronic device 602 to the database 620 of the first electronic device 601 and update the information 621 on whether the 'character #01 has been checked and the information 625 on whether the 'character #03' has been checked at a database 630 of a character application connected to the 'character #01 and the 'character #03'.

According to an embodiment, the first electronic device 601 can update information in which the 'character #01' transmitted to the second electronic device has been checked by the user of the second electronic device 602 at the database 620 of the first electronic device 601. Further, the first electronic device 601 can transmit the information to the second electronic device 602, and the second electronic device 602 can update the information at the database 620 of the second electronic device 602.

According to an embodiment, the first electronic device 601 can detect information about an event that is not checked with reference to the database 620 and a database 630 or 640 in which each application includes. When the first electronic device 601 checks information 615 about the 'character #03' of the database 620 of FIG. 6, the first electronic device 601 can determine that the 'character #03' has been output from the second electronic device 602 and that the 'character #03' is in a state that is not checked. Additionally or alternatively, according to an embodiment, the first electronic device 601 can output notification about the 'character #03' with reference to the database 620 or the status information received in the second electronic device 602. When the 'character #03' has been checked in the first electronic device 601 by the user of the first electronic device 601, the first electronic device 601 can update information in which the 'character #03' has been checked by the user of the first electronic device 601 at the database 620 of the first electronic device 601. Further, in order to update the information at the database 620 of the second electronic device 602, the first electronic device 601 can transmit the information to the second electronic device 602.

According to a embodiment, in order to enable the second electronic device 602 to output the 'character #03', the first electronic device 601 can retransmit notification information about the 'character #03' to the second electronic device 602. Further, according to an embodiment, in order to enable a third electronic device (e.g., the third electronic device 314) (not shown), which is another external device to output the 'character #03', the first electronic device 601 can transmit notification information about the 'character #03' to the third electronic device. Alternatively, the first electronic device 601 may not retransmit the transmitted notification information about the 'character #03' to the second electronic device 602 and can await until the second electronic device 602 checks the transmitted notification information. When the first electronic device 601 receives information on whether the 'character #03' has been checked or when the 'character #03' is not checked for a designated time or more, the first electronic device 101 can update information on whether the 'character #03' has been checked at the database 620 of the first electronic device 601 and the database 630 of a character application.

According to a embodiment, the first electronic device 601 can output notification about a 'weather #02' event that has occurred and record information about a check status checked in the first electronic device 601 at the database 620 together with information 613 about 'weather #02', and update the information at a database 640 of a weather application. Alternatively, according to an embodiment, notification (e.g., weather #02) checked in the first electronic device 601 can be deleted from the database 620 or the database 640 of a weather application. The first electronic device 601 can determine an event that has been output one time or more but that was not checked according to the database 620 or a database of each application and process to re-output the event that was not checked.

According to various embodiments, the electronic device (e.g., the electronic device 101) that provides notification can include a determining module (e.g., a determining module 210) for determining notification information, an acquiring module (e.g., an acquiring module 230) for acquiring the status information about at least one of the electronic device or at least one of external device communicating with the electronic device, and a providing module (e.g., a providing module 240) for providing the notification information through at least one of the electronic device or the at least one of external device based on the status information.

According to various embodiments, the acquiring module can acquire information corresponding to designated information based on an attribute of the notification information as the status information.

According to various embodiments, the providing module can provide the notification information through a device in which the user presently uses based on the status information about the user of the electronic device acquired as the status information.

According to various embodiments, when an application executing in the electronic device has a priority higher than that of the notification information, the providing module can transmit the notification information to the at least one external device.

According to various embodiments, the determining module can determine information in which the user of the electronic device is not checked through the electronic device as the notification information.

According to various embodiments, the determining module can determine information in which the electronic device does not transmit to the at least one external device as the notification information.

According to various embodiments, the acquiring module can acquire the notification information having a first priority and information about an application having a second priority executing in the electronic device.

According to various embodiments, the providing module can provide the notification information through the electronic device based on that the first priority is higher than the second priority and can provide the notification information through the at least one external device based on that the first priority is lower than the second priority.

According to various embodiments, the providing module can provide the notification information through an enabled device of the electronic device and the at least one external device.

According to various embodiments, the providing module can provide the notification information through a device that acquires user information corresponding to information set to be related to the user of the electronic device. For example, when the electronic device acquires the user's touch input and when the at least one external device does not acquire the user's touch input, the providing module can provide the notification information through the electronic device.

According to various embodiments, when power source information or load information acquired as the status information corresponds to a range designated to the electronic device, the providing module can provide the notification information through a device corresponding to the status information.

According to various embodiments, when the electronic device or the at least one external device is located at a first location, the providing module can provide the notification information through the electronic device, and when the electronic device or the at least one external device is located at a second location, the providing module can provide the notification information through the at least one external device.

According to various embodiments, when time information acquired as the status information is a first time, the providing module can provide the notification information through the electronic device, and when time information acquired as the status information is a second time, the providing module can provide the notification information through the at least one external device.

According to various embodiments, when communication information or distance information between the electronic device and the at least one external device belongs to a range designated to the electronic device, the providing module can transmit the notification information to the at least one external device.

According to various embodiments, the electronic device includes a first processor for processing an application and a second processor for controlling communication with the electronic device, and when the first processor executes the application, the providing module can transmit the notification information to the at least one external device through the second processor.

According to various embodiments, the electronic device can acquire check information on whether the user of the electronic device and the at least one external device checks the notification information or transmitting information on whether the electronic device has transmitted the notification information to the at least one external device and store the check information or the transmitting information at a database functionally connected to the electronic device.

According to various embodiments, when the check information or the transmitting information is changed, the electronic device can update the database.

According to various embodiments, the acquiring module can be set to acquire at least one of wearing information, sight line information, gesture information, and authentication information of the user of at least one of the electronic device and at least one external device as the status information.

According to various embodiments, the acquiring module can control to acquire the status information about whether at least one of the electronic device and at least one external device is using.

According to various embodiments, the determining module can control to determine notification information based on whether the user check input is acquired among at least one notification information related to the electronic device.

According to various embodiments, the acquiring module can acquire user input information acquired in the electronic device as the status information, and the providing module can control to provide notification information through at least one of the electronic device or at least one external electronic device based on user input information.

According to various embodiments, when the electronic device acquires user input information, the providing module provides notification information through the electronic device, and when the electronic device does not acquire user input information, the providing module can control to provide notification information through at least one external device. According to various embodiments, the acquiring module can be set to include sensor information detected by a sensor functionally connected to at least one of the electronic device or at least external device in user input information or the status information.

According to various embodiments, the providing module can provide the notification information through an enabled device of the electronic device and the at least one external device.

According to various embodiments, the acquiring module can be set to acquire enabling the status information of a display functionally connected to each of the electronic device and at least one external device as the status information.

According to various embodiments, the acquiring module acquires enabling the status information of the electronic device as the status information, and the providing module can control to provide notification information through at least one of the electronic device or at least one external electronic device based on the enabling status information. According to various embodiments, when the electronic device is in an enabling status, the providing module can control to provide notification information through the electronic device, and when the electronic device is in a disabling status, the providing module can control to provide notification information through at least one external device.

According to various embodiments, the acquiring module acquires attribute information of an application executing in the electronic device as the status information, and the providing module can control to provide notification information through at least one of the electronic device or at least one external electronic device based on attribute information of an application.

According to various embodiments, the determining module, the acquiring module, and the providing module are connected to a first processor that processes transmission and reception of information, the determining module determines notification information through the first processor, the acquiring module determines whether a second processor that controls operations of the electronic device through the first processor is in a state that can provide notification information, and the providing module can control to transmit notification information to a second electronic device through the first processor, if a second processor is not in a state that can provide notification information.

According to various embodiments, the electronic device includes a first processor and a second processor, and when the first processor determines notification information and the second processor executes an application, the providing module can control at least one external device to provide notification information through the first processor based on an attribute of the application.

According to various embodiments, the providing module can control to provide notification information through at least one of methods of outputting with a sound designated in the electronic device or at least one external device electronic device, displaying in at least one display unit, or vibrating the electronic device or at least one external device with a designated method.

According to various embodiments, when providing notification information with at least one external device, the acquiring module receives feedback information from at least one external device, having provided notification information, and the providing module can determine that notification information provided from at least one external device is not checked through the feedback information and provide notification information to retransmit the notification information to at least one external device. According to various embodiments, the acquiring module can control to acquire feedback information that records whether notification information provided to at least one external electronic device has been checked.

According to various embodiments, the determining module can determine that provided notification is not checked, and the providing module can control to provide again notification information.

According to various embodiments, the determining module can determine that provided notification is not checked, the acquiring module can acquire the status information of at least one external device, and the providing module can control the external device to provide notification information or to transmit notification information to at least one external device according to whether notification information determined as the status information can be provided.

According to various embodiments, the acquiring module can control to include at least one of enabling information of the electronic device or at least one external device, performing operation information, importance level information of a performing operation, battery residual quantity information, communication state information with a connected device, at least one acquired sensing information, information about a priority of an application or a function that can operate, and information on whether provided notification has been checked in the status information. According to various embodiments, the acquiring module can control to include distance information between an electronic device and at least one external electronic device acquired with at least one connected communication method in communication state information.

According to another embodiment, the electronic device can be an application for performing operation of determining notification information, operation of acquiring the status information related to at least one of the electronic device and at least one external device, and operation of controlling to provide notification information through at least one of the electronic device and at least one external device based on the status information, or a computer readable recording medium on which the application is recorded.

According to another embodiment, the first electronic device includes a touch screen that outputs notification information, a memory that stores the notification information in the first electronic device, and a notification processing module that processes the notification information; and at least one processor that executes the notification processing module, and the notification processing module can control to detect notification occurrence and to acquire the first status information on the first electronic device and control to output the notification or to transmit the notification information to the second electronic device according to whether notification determined as the first status information is output.

According to various embodiments, at step of transmitting notification information, the notification processing module receives the second status information of the connected second electronic device, and when the received the second status information represents a state that can output, the notification processing module can control to transmit notification information to the second electronic device. According to various embodiments, at step of transmitting notification information, the notification processing module can control the notification information to process an output of the notification of the second electronic device.

According to various embodiments, at step of transmitting notification information, the notification processing module receives each state information from the second electronic device and a third electronic device connected to the electronic device, and when the received state information of each of the second electronic device and the third electronic device represents a state that can output, the notification processing module can control to transmit the notification information to the second electronic device and/or the third electronic device.

According to various embodiments, when transmitting the notification information to the second electronic device, the notification processing module can control to receive feedback information from the second electronic device, to determine that the notification information in which the second electronic device outputs is not checked through the feedback information, and to retransmit the notification information to the second electronic device. According to various embodiments, after the notification processing module outputs the notification information from the second electronic device, the notification processing module can control to determine information that records whether the output notification information has been checked as the feedback information. According to various embodiments, the notification processing module can control the second electronic device to determine whether the notification information has been checked with operation of controlling at least one application connected to the notification information.

According to various embodiments, the notification processing module can control the second electronic device to determine whether the notification information has been checked with a load of the notification information.

According to various embodiments, the notification processing module can control to determine notification of at least one of a received calling request, a received message, and notification of an alarm operation as the notification.

According to various embodiments, the notification processing module can determine that the output notification is not checked when outputting the notification and control to re-output the notification.

According to various embodiments, the notification processing module can control to determine that the output notification is not checked when outputting the notification, to acquire the second status information of the electronic device, and to re-output the notification or to retransmit the notification information to the second electronic device according to whether notification determined as the second status information can be output.

According to various embodiments, the notification processing module can control to include at least one of enabling information, performing operation information, importance level information of the performing operation, and battery residual quantity information of the first electronic device, communication state information with the second electronic device, at least one acquired sensing information, information about a priority of an application or a function that can operate, and information on whether output notification has been checked as the status information of the first electronic device and can control to include at least one of enabling information, performing operation information, importance level information of the performing operation, and battery residual quantity information of the second electronic device, communication state information with the first electronic device, at least one acquired sensing information, information about a priority of an application or a function that can operate, and information on whether output notification has been checked as the status information of the second electronic device.

According to various embodiments, the notification processing module can detect at least one of information that detects a pupil of the user and information that detects a touch and control to determine the detected information as sensing information. According to various embodiments, the notification processing module can further include distance information between the first electronic device and the second electronic device acquired with at least one communication method and control to determine the first status information or the second status information.

According to another embodiment, an electronic device can include a touch screen that outputs notification information, a memory that stores the notification information in the electronic device, a notification processing module that processes the notification information, and at least one processor that executes the notification processing module, and in the notification processing module, a first processor that processes transmission and reception of information receives notification information, and the first processor determines whether a second processor that controls operation of the electronic device is in a state that can control an output of the notification information, and when the second processor is not in a state that can control an output of the notification information, the first processor can control to transmit the notification information to the second electronic device.

Figure 7:
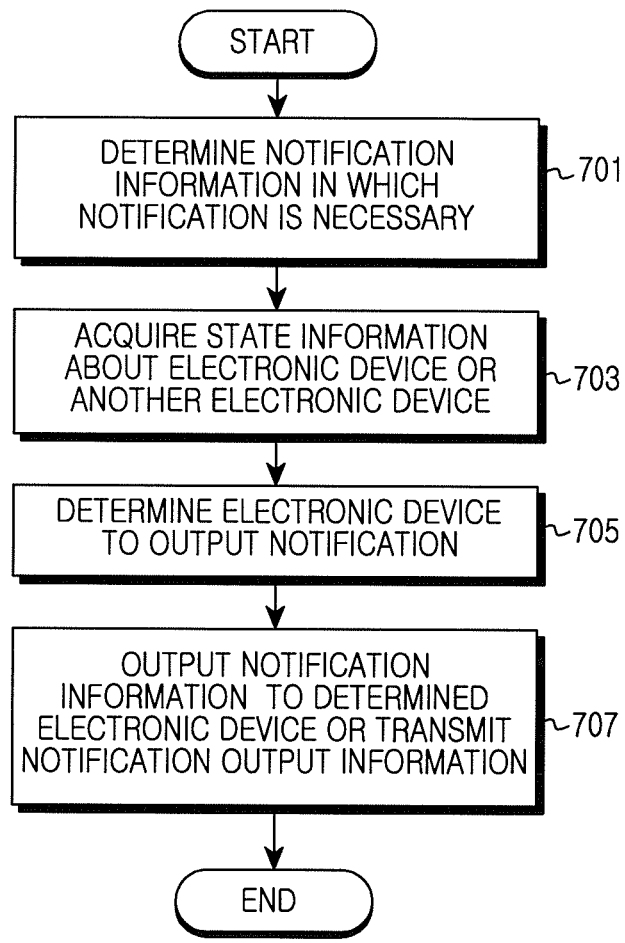
FIG. 7 is a flowchart illustrating the operation of processing notification information in an electronic device according to various embodiments of the present invention.

FIG. 7 is a flowchart illustrating the operation of processing notification information in an electronic device according various embodiments.

Referring to FIG. 7, the electronic device 101 can detect an event to provide notification, acquire the status information of the electronic device 101 and another electronic device, and determine at least one electronic device to output notification information through a database of the electronic device 101 and the acquired status information, and an output notification or a transmit notification information to the determined electronic device.

The electronic device 101 can detect that an event to provide notification occurs, such as an alarm function necessary to notify to the user and a phone connection and message data received through the communication interface 170 (701). The electronic device 101 can detect an event to provide notification in a sleep mode the status and detect an event to provide notification in a state in which at least one operation or function is performing.

The electronic device 101 can acquire the status information about the electronic device 101 or at least one connected another electronic device (703). The status information that the electronic device 101 or at least one another electronic device acquires can include at least one of information on whether the electronic device 101 is in an enabling status or a disabling status (can be determined by whether the AP or the CP is in an enabling status), a performing operation or function when the electronic device 101 is in an enabling status, the status information of the user and/or each device information measured through at least one sensor in which the electronic device 101 includes among sensors such as a touch sensor, a grip sensor, a motion sensor (e.g., an acceleration sensor, a gyro sensor), an image sensor, a proximity detection sensor, a microphone, and a living body detection sensor (a fingerprint detection sensor, a vein detection sensor, and a temperature sensor), information about a communication state with at least one another electronic device connected to the electronic device 101 or at least one communication method that can be connected to another electronic device 602, distance information between two devices checked through signal strength of a communication method in which the electronic device 101 and the another electronic device 602 are connected, information about a priority of an application and/or a function that can operate in the electronic device 101, and information on whether output notification has been checked.

The electronic device 101 can determine at least one electronic device to output notification about an event that has occurred through the acquired status information and information stored at a database (705).

According to an embodiment, when the electronic device 101 detects that an event to provide notification occurs in a sleep mode status, the electronic device 101 can determine another electronic device to output notification according to information stored at a database and the acquired status information. According to an embodiment, when the electronic device 101 is in an enabling status, the electronic device 101 can determine a priority of a performing function and an event to provide notification with reference to a database, and when it is determined that a priority of a function performing in the electronic device 101 is high, the electronic device 101 can determine another electronic device to output notification through information stored at a database and the acquired status information. According to another embodiment, when it is determined that a wearable device (or an electronic device) connected to the electronic device 101 is in a wearing status or when it is determined that a wearing device is located within a designated distance from the electronic device 101, the electronic device 101 can determine the wearable device in which the user is wearing to output notification about an event to provide notification that has occurred in the electronic device 101.

The electronic device 101 detects an event to provide notification and when it is determined that the first electronic device 101 outputs notification information, the electronic device 101 can output corresponding notification (707). According to an embodiment, when it is determined that the electronic device 101 outputs received message data, the electronic device 101 can output the received message data with a method of generally outputting a received message. When the electronic device 101 outputs message data and checks a corresponding message, the electronic device 101 can store information about check at a database or a database of a message (character) application connected to message data.

According to another embodiment, the electronic device 101 detects an event to provide notification and when it is determined that another electronic device connected to the first electronic device 101 outputs notification information, the electronic device 101 can transmit output information of corresponding notification to the determined another electronic device. According to an embodiment, when the electronic device 101 receives an e-mail while reproducing media data, the electronic device 101 can determine another electronic device to output notification about e-mail reception through a database and the acquired status information. The electronic device 101 can transmit information that processes to output notification about e-mail reception to the determined another electronic device. The electronic device 101 can receive information about whether an e-mail corresponding to notification output from another electronic device, having transmitted notification information has been checked.

When the electronic device 101 performs operation 707, an embodiment of FIG. 7 can be terminated.

Figure 8:
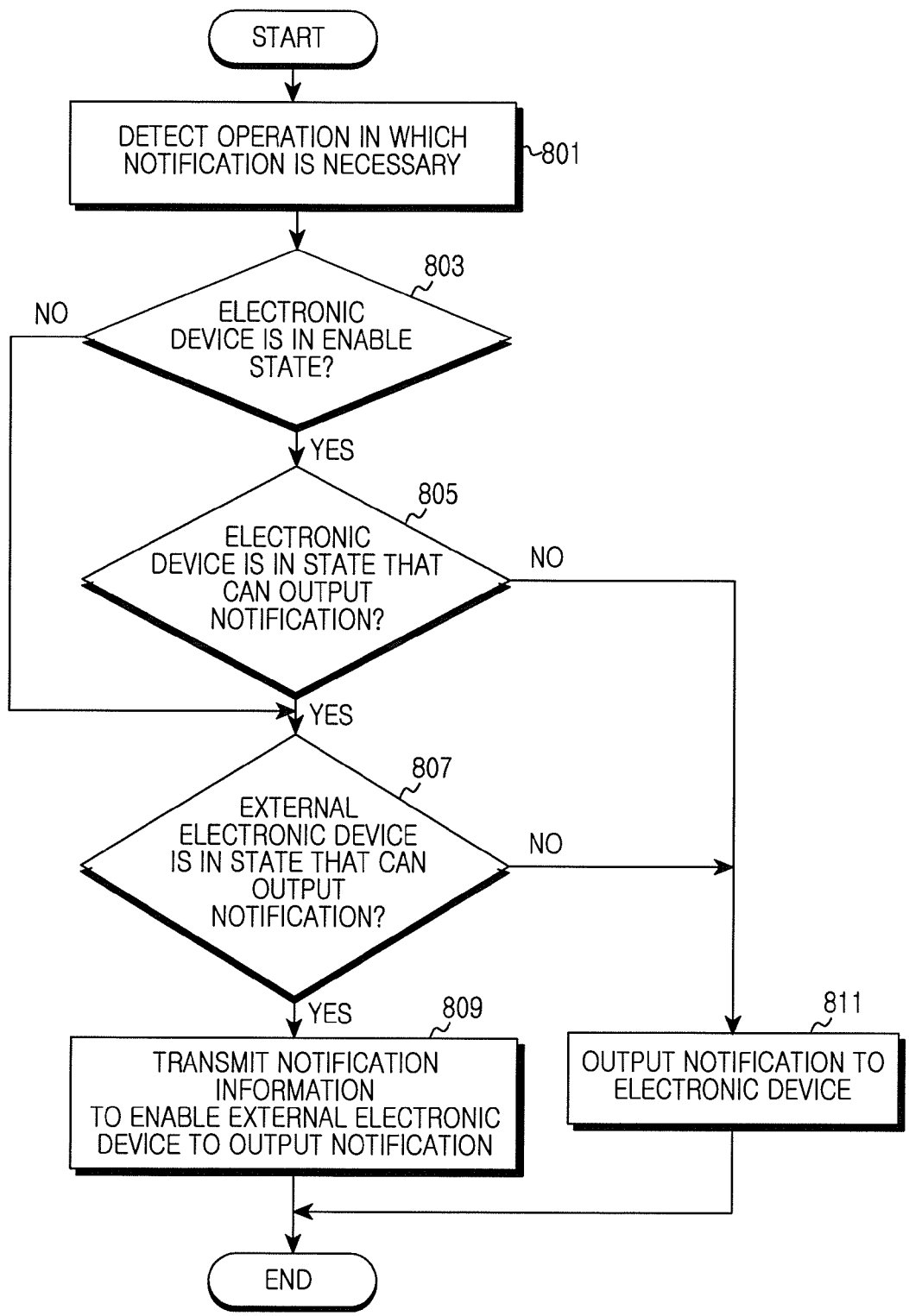
FIG. 8 is a flowchart illustrating the operation of providing notification information in an electronic device according to various embodiments of the present invention.

FIG. 8 is a flowchart illustrating the operation of providing notification information in an electronic device according to various embodiments.

Referring to FIG. 8, the electronic device 101 can detect an event to provide notification and control notification information so that the electronic device 101 or an external electronic device outputs notification. Here, the external electronic device can be the above-described another electronic device (e.g., an electronic device 602, an electronic device 104, or a server 164) and can be represented with the above-described various methods of an external device, the second electronic device 602, and the third electronic device 104.

The electronic device 101 can detect that an event to provide notification occurs in operation 801. Here, an event to provide notification can be a receiving operation through the communication interface 170 such as phone connection and message data in the electronic device 101 and can be operation necessary to notify to the user, such as an alarm function.

The electronic device 101 can determine whether the electronic device is in an enable state in operation 803. According to an embodiment, the electronic device 101 can include at least one processor, and the processor 160 can include an application processor (AP) or a communication processor (CP). The AP or the CP can be independently formed as each processor and be included in one processor. The AP can be a processor that controls operation of an application of the electronic device 101 or at least one partial device constituting the electronic device 101, and the CP can be a processor that transmits and receives information to and from an external electronic device through short range wireless communication or communication using the network 162. When the AP is in an enabling status, the electronic device 101 can perform operation 805, and when the AP is in a disabling status, the electronic device 101 can perform operation 807.

The AP can be in an enabling status and the electronic device 101 can determine whether the electronic device 101 satisfies a condition that can output notification through the AP in operation 805. According to an embodiment, when the electronic device 101 performs at least one application and function, the electronic device 101 can detect occurrence of an event to provide notification. The electronic device 101 can determine whether to process the electronic device 101 or an external electronic device to output notification of operation that has occurred through a priority and/or importance level information between a performing application or function and an event to provide notification through information of a database and status information. When it is determined that the electronic device 101 outputs notification of operation that has occurred, the electronic device 101 can perform operation 811, and when it is determined that the external electronic device outputs notification of operation that has occurred, the electronic device 101 can perform operation 807.

The electronic device 101 can acquire status information of at least one external electronic device from at least one connected external electronic device. The electronic device 101 can determine whether an external electronic device is in a state that can output information about notification that has occurred through information of a database and the acquired status information in operation 807. According to an embodiment, it can be determined whether the electronic device can output information about notification that has occurred in the electronic device 101 through at least one of information such as information on whether the external electronic device is wearing, when the external electronic device is a wearable electronic device, a priority and/or importance level information between operations that output information about notification that has occurred when there is an application or a function in which the external electronic device is performing, and a distance measured between the electronic device 101 and the external electronic device. When an external electronic device can output information about notification that has occurred in the electronic device 101, the electronic device 101 can perform operation 809, and when the external electronic device may not output information about notification that has occurred in the electronic device 101, the electronic device 101 can perform operation 811.

The electronic device 101 can transmit notification information to the external electronic device determined to output information about notification that has occurred in operation 809. The external electronic device can output notification (or notification information) according to received notification information. The external electronic device can store information about whether the external electronic device has checked output notification and transmit the information to the electronic device 101.

When the electronic device 101 performs operation 809, an embodiment of FIG. 8 can be terminated. The electronic device 101 can output information about notification that has occurred (811). The electronic device 101 can store information about whether the electronic device 101 has checked output notification, and when a history that checks information corresponding to output notification is not detected in the electronic device 101 or connected another electronic device, the electronic device 101 can re-output output notification or can transmit or retransmit output notification to another electronic device.

When the electronic device 101 performs operation 811, an external embodiment of FIG. 8 can be terminated.

According to various embodiments, a method of operating an electronic device can include operation of determining notification information, the operation of acquiring the status information related to at least one of the electronic device or at least one external device communicating with the electronic device, and operation of controlling to provide the notification information through at least one of the electronic device and at least one external device based on the status information.

According to various embodiments, the operation of determining can include operation in which the user of the electronic device determines information that is not checked through the electronic device as the notification information.

According to various embodiments, the operation of determining can include operation of determining information that is not transmit from the electronic device to the at least one external device as the notification information.

According to various embodiments, the operation of acquiring can include operation of acquiring the notification information having a first priority and information about an application having a second priority executing in the electronic device.

According to various embodiments, the operation of providing can include operation of providing the notification information through the electronic device based on that the first priority is higher than the second priority and providing the notification information through the at least one external device based on that the first priority is lower than the second priority.

According to various embodiments, the operation of providing can include operation of providing the notification information through a device that acquires user information corresponding to information set to be related to the user of the electronic device.

According to various embodiments, the operation of providing can include operation of providing the notification information through a device corresponding to the status information, when power source information or load information acquired as the status information corresponds to a range designated to the electronic device.

According to various embodiments, the operation of providing can include operation of providing the notification information through the electronic device, when the electronic device or the at least one external device is located at a first location and providing the notification information through the at least one external device, when the electronic device or the at least one external device is located at a second location.

According to various embodiments, the operation of providing can include operation of providing the notification information through the electronic device, when time information acquired as the status information is a first time and providing the notification information through the at least one external device, when time information acquired as the status information is a second time.

According to various embodiments, the operation of providing can include operation of transmitting the notification information to the at least one external device, when communication information or distance information between the electronic device and the at least one external device belongs to a range designated to the electronic device.

According to various embodiments, the electronic device can acquire check information on whether the user of the electronic device and the at least one external device has checked the notification information or transmitting information on whether the electronic device has transmitted the notification information to the at least one external device, and the check information or the transmitting information can be stored at a database functionally connected to the electronic device.

According to various embodiments, the operation of storing can include updating the database, when the check information or the transmitting information is changed.

According to various embodiments, the status information can include information on whether at least one of an electronic device or at least one external device is using.

According to various embodiments, the operation of determining can include operation of determining notification information based on whether a user check input has been acquired among at least one notification information related to the electronic device.

According to various embodiments, the operation of determining can include operation of acquiring user check information of each of at least one notification information from at least one external device.

According to various embodiments, the status information can include at least one information of power information and load information of at least one of an electronic device or at least one external device, status information of the user, and information designated at the electronic device.

According to various embodiments, the status information can include user input information acquired in the electronic device, and operation of controlling can include operation of controlling to provide notification information through at least one device of an electronic device or at least one external electronic device based on user input information. According to various embodiments, user input information can include information detected by a sensor functionally connected to at least one of an electronic device or at least one external device.

According to various embodiments, the operation of controlling can include operation of controlling to provide notification information through the electronic device, when the electronic device acquires user input information and to provide notification information through at least one external device, when the electronic device does not acquire user input information.

According to various embodiments, the operation of providing can include operation of providing the notification information through an enabled device of the electronic device and the at least one external device. According to various embodiments, the operation of controlling can include operation of controlling to provide notification information through the electronic device, when the electronic device is in an enabling status and to provide notification information through at least one external device, when the electronic device is in a disabling status.

According to various embodiments, the status information can include attribute information of an application performing in the electronic device, and operation of controlling can include operation of controlling to provide notification information through at least one device of an electronic device or at least one external electronic device based on attribute information of an application.

According to various embodiments, the electronic device can include a first processor for processing an application and a second processor for controlling communication of the electronic device, and operation of providing can include operation of transmitting the notification information to the at least one external device through the second processor, when the first processor executes the application.

According to various embodiments, the operation of providing can use at least one of methods of outputting with a sound designated in an electronic device or at least one external device, displaying with an image and/or a text in at least one display unit, and vibrating an electronic device or at least one external device with a designating method.

According to various embodiments, the electronic device includes a first processor and a second processor, and operation of determining can include operation of determining notification information in the first processor and operation of executing an application in the second processor.

According to various embodiments, the operation of controlling can include operation of controlling at least one external device to provide notification information through the first processor based on an attribute of an application.

According to various embodiments, the operation of providing notification information to at least one external device can further include operation of receiving feedback information from at least one external device that provides notification information, operation of determining notification information provided in at least one external device as information that is not checked through feedback information, and operation of retransmitting notification information to at least one external device. According to various embodiments, feedback information can be information that records whether provided notification information has been checked after at least one external electronic device provides notification information.

According to various embodiments, the operation of providing notification information can further include operation of determining that provided notification is not checked and operation of providing again notification information.

According to various embodiments, the operation of providing notification can further include operation of determining that notification is not checked, the operation of acquiring the status information of at least one external device, and operation in which the electronic device provides notification information or operation of transmitting notification information to at least one external device according to whether notification information determined as the status information can be provided.

According to various embodiments, the status information can include at least one of enabling information of the electronic device or at least one external device, performing operation information, importance level information of a performing operation, battery residual quantity information, communication state information with a connected device, acquired at least one sensing information, information about a priority of an application or a function that can operate, and information about whether provided notification has been checked. According to various embodiments, communication state information can further include distance information between an electronic device and at least one external device acquired with at least one connected communication method.

According to various embodiments, the status information can include at least one information of distance information or communication information between the electronic device and at least one external device.

According to another embodiment, a method of operating a first electronic device can include step of detecting notification occurrence, step of acquiring the first status information of the first electronic device, and the step of outputting the notification or transmitting the notification information to a second electronic device according to whether notification determined as the first status information is output.

According to various embodiments, the step of transmitting the notification information can include the step of receiving the second status information of the connected second electronic device and step of transmitting the notification information to the second electronic device when the received second status information represents a state that can be output. According to various embodiments, the step of transmitting the notification information can include control information that processes an output of the notification of the second electronic device in the notification information.

According to various embodiments, the step of transmitting the notification information can include the step of receiving the status information of each thereof from the second electronic device and a third electronic device connected to the electronic device and step of transmitting the notification information to the second electronic device and/or the third electronic device, when the received the status information of each of the second electronic device and third electronic device represents a state that can output.

According to various embodiments, the step of transmitting the notification information to the second electronic device can further include step of receiving feedback information from the second electronic device, the step of determining that the notification information in which the electronic device outputs is not checked through the feedback information, and the step of retransmitting the notification information to the second electronic device. According to various embodiments, the feedback information can be information that records whether the output notification information has been checked after the second electronic device outputs the notification information. According to various embodiments, whether the notification information has been checked can be determined with operation in which the second electronic device controls at least one application connected to the notification information. According to various embodiments, the notification can be determined as notification of at least one of a received calling request, a received message, and notification of an alarm operation.

According to various embodiments, the step of outputting notification can further include the step of determining that the output notification is not checked and step of re-outputting the notification.

According to various embodiments, the step of outputting notification can further include step of determining that the output notification is not checked, step of acquiring the second the status information of the electronic device, and the step of re-outputting the notification or retransmitting the notification information to the second electronic device according to whether notification determined as the second the status information can be output.

According to various embodiments, the first the status information of the first electronic device can include at least one of enabling information of the first electronic device, performing operation information, importance level information of the performing operation, battery residual quantity information, communication state information with a second electronic device, at least one acquired sensing information, information about a priority of an application or a function that can operate, and information on whether output notification has been checked, and the second the status information of the second electronic device can include at least one of enabling information of the second electronic device, performing operation information, importance level information of the performing operation, battery residual quantity information, communication state information with the first electronic device, at least one acquired sensing information, information about a priority of an application or a function that can operate, and information on whether output notification has been checked. According to various embodiments, each sensing information can detect at least one of information that detects the user's pupil and information that detects a touch. According to various embodiments, each communication status information can further include distance information between the first electronic device and the second electronic device that acquires with at least one communication method.

According to another embodiment, a method of operating an electronic device can include step in which a first processor that processes transmission and reception of information receives notification information, step of determining whether a second processor that controls operation of the electronic device is in a state that can output the notification information, and step in which the first processor transmits the notification information to a second electronic device, when the second processor is not in a state that can control an output of the notification information.

Figure 9:
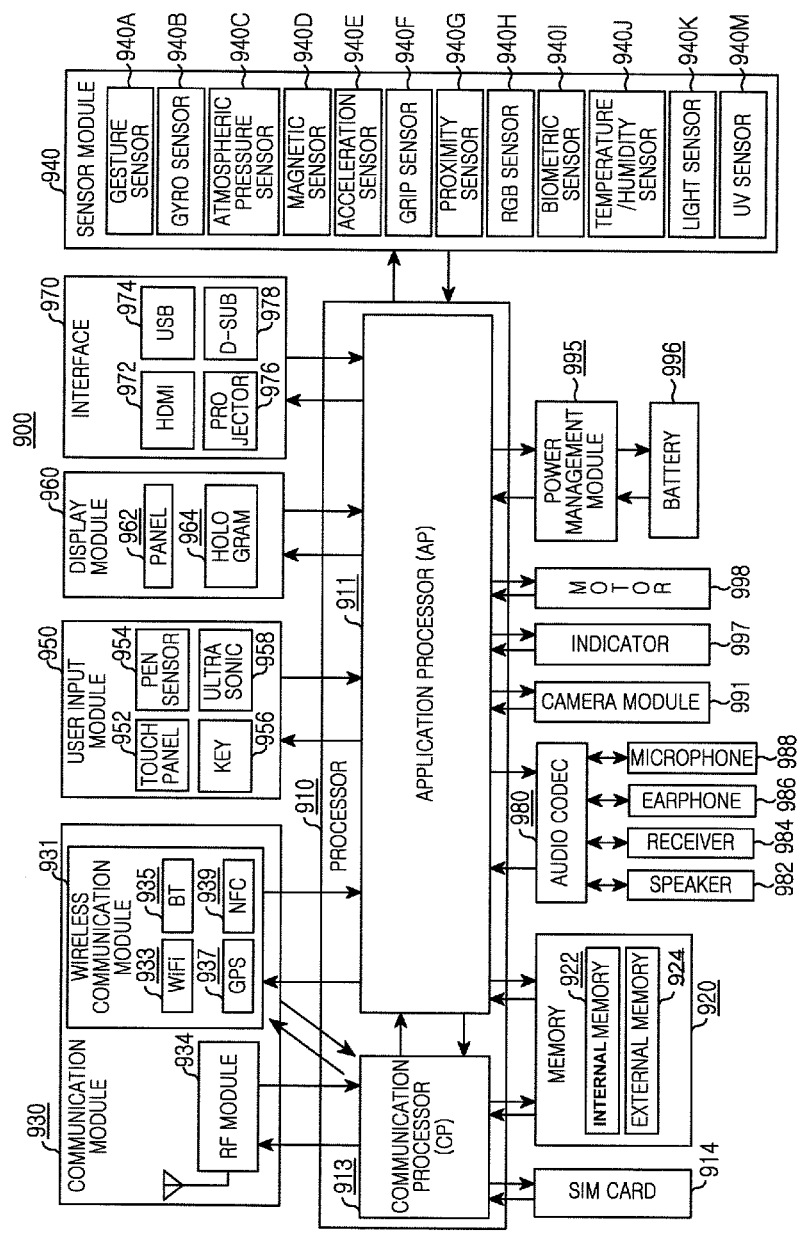
FIG. 9 is a block diagram of an electronic device according to various embodiments of the present invention.

FIG. 9 is a block diagram illustrating hardware 900 according to various embodiments. The hardware 900 can form, for example, the entire or a portion of the electronic device 101 of FIG. 1. Referring to FIG. 9, the hardware 900 can include at least one processor 910, a subscriber identification module (SIM) card 914, a memory 920, a communication module 930, a sensor module 940, a user input module 950, a display module 960, an interface 970, an audio codec 980, a camera module 991, a power management module 995, a battery 996, an indicator 997, and a motor 998.

The processor 910 (e.g., the processor 160) can include at least one application processor (AP) 911 or at least one communication processor (CP) 913. The processor 910 can be, for example, the processor 160 of FIG. 1. As shown in FIG. 9, the AP 911 and the CP 913 are included within the processor 910, but the AP 911 and the CP 913 can be included within different IC packages, respectively. In an embodiment, the AP 911 and the CP 913 can be included within one IC package.

The AP 911 can drive an operation system or an applied application to control a plurality of hardware or software elements connected to the AP 911 and perform various data processing and calculation including multimedia data. The AP 911 can be embodied, for example, with a system on chip (SoC). According to an embodiment, the processor 910 can further include a graphic processing unit (GPU) (not shown).

The CP 913 can perform a function of managing a data link in communication between an electronic device (e.g., the electronic device 101) including the hardware 900 and another electronic device connected by a network and a function of converting a communication protocol. The CP 913 can be embodied, for example, with a SoC. According to an embodiment, the CP 913 can perform at least a portion of a multimedia control function. The CP 913 can perform identification and authentication of a terminal within a communication network using, for example, a subscriber identification module (e.g., the SIM card 914). Further, the CP 913 can provide services such as audio dedicated communication, audiovisual communication, a text message, or packet data to the user.

Further, the CP 913 can control data transmission and reception of the communication module 930. In FIG. 9, elements of the CP 913, the power management module 995, or the memory 920 are elements separate from the AP 911, but according to an embodiment, the AP 911 can include at least a portion (e.g., the CP 913) of the foregoing elements.

According to an embodiment, the AP 911 or the CP 913 can load and process an instruction or data received from at least one of a non-volatile memory and another element connected to each thereof in a volatile memory. Further, the AP 911 or the CP 913 can be received from at least one of other elements or can store data generated by at least one of other elements at a non-volatile memory.

The SIM card 914 can be a card that embodies a subscriber identification module and be inserted into a slot formed in a specific location of an electronic device. The SIM card 914 can include intrinsic identification information (e.g., integrated circuit card identifier (ICCID) or subscriber information (e.g., international mobile subscriber identity (IMSI).

The memory 920 can include a built-in memory 922 or a removable memory 924. The memory 920 can be, for example, the memory 130 of FIG. 1. The built-in memory 922 can include at least one of, for example, a volatile memory (e.g., a dynamic RAM (DRAM), a static RAM (SRAM), a synchronous dynamic RAM (SDRAM)), or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a NAND flash memory, and a NOR flash memory). According to an embodiment, the built-in memory 922 can have a form of a Solid State Drive (SSD). The removable memory 924 can further include a flash drive, for example, a compact flash (CF), secure digital (SD), micro secure digital (Micro-SD), mini secure digital (Mini-SD), extreme digital (xD), or a memory stick.

The communication module 930 can include a wireless communication module 931 or a radio frequency (RF) module 934. The communication module 930 can be, for example, the communication interface 170 of FIG. 1. The wireless communication module 931 can include, for example, WiFi 933, Bluetooth (BT) 935, GPS 937, or near field communication (NFC) 939. For example, the wireless communication module 931 can provide a wireless communication function using a radio frequency. Additionally or alternatively, the wireless communication module 931 can include a network interface (e.g., a LAN card) or a modem for connecting the hardware 900 to a network (e.g., Internet, a local area network (LAN), a wire area network (WAN), a telecommunication network, a cellular network, a satellite network, or a plain old telephone service (POTS).

The RF module 934 can perform transmission and reception of data, for example, transmission and reception of an RF signal or a called electronic signal. Although not shown, the RF module 934 can include, for example, a transceiver, a power amp module (PAM), a frequency filter, or a low noise amplifier (LNA). Further, the RF module 934 can further include a component, for example, a conductor or a leading wire for transmitting and receiving electromagnetic waves on free space in wireless communication.

The sensor module 940 can include at least one of, for example, a gesture sensor 940A, a gyro sensor 940B, an atmospheric pressure sensor 940C, a magnetic sensor 940D, an acceleration sensor 940E, a grip sensor 940F, a proximity sensor 940G, a red, green, and blue (RGB) sensor 940H, a living body sensor 940I, a temperature/humidity sensor 940J, an illumination sensor 940K, and a ultra violet (UV) sensor 940M. The sensor module 940 can measure a physical quantity or detect an operation status of an electronic device and convert measured or detected information to an electric signal. Additionally or alternatively, the sensor module 940 can include, for example, an E-nose sensor (not shown), an electromyography sensor (EMG sensor) (not shown), an electroencephalogram sensor (EEG sensor) (not shown), an electrocardiogram sensor (ECG sensor) (not shown), or a fingerprint sensor. The sensor module 940 can further include a control circuit that controls at least one sensor belonging to the inside.

The user input module 950 can include a touch panel 952, a (digital) pen sensor 954, a key 956, or an ultrasonic wave input device 958. The user input module 950 can be, for example, the input and output interface 140 of FIG. 1. The touch panel 952 can recognize a touch input with at least one method of for example, a capacitive, resistive, infrared ray, or ultrasonic wave method. Further, the touch panel 952 can further include a controller (not shown). When the touch panel 952 is a capacitive type touch panel, the touch panel 952 can perform a direct touch or proximity recognition. The touch panel 952 layer can further include a tactile layer. In this case, the touch panel 952 can provide a haptic reaction to the user.

The (digital) pen sensor 954 can be embodied using the same method as and a method similar to, for example, reception of a touch input of the user or a separate recognition sheet. As the key 956, for example, a keypad or a touch key can be used. The ultrasonic wave input device 958 is a device that can check data by detecting a sound wave with a microphone (e.g., a microphone 988) in a terminal through a pen that generates an ultrasonic wave signal and can perform wireless recognition. According to an embodiment, the hardware 900 can receive a user input from an external device (e.g., a network, a computer, or a server) connected to the communication module 930 using the communication module 930.

The display module 960 can include a panel 962 or a hologram 964. The display module 960 can be, for example, the display module 150 of FIG. 1. The panel 962 can be, for example, a liquid-crystal display (LCD) or an active-matrix organic light-emitting diode (AM-OLED). The panel 962 can be embodied with, for example, a flexible, transparent, or wearable method. The panel 962 can be formed with one module and the touch panel 952. The hologram 964 can show a stereoscopic image in the air using interference of light. According to an embodiment, the display module 960 can further include a control circuit that controls the panel 962 or the hologram 964.

The interface 970 can include, for example, a high-definition multimedia interface (HDMI) 972, a universal serial bus (USB) 974, a projector 976, or a D-subminiature (D-SUB) 978. Additionally or alternatively, the interface 970 can include, for example, secure digital (SD)/multi-media card (MMC)(not shown) or infrared data association (IrDA) (not shown).

The audio codec 980 can convert a sound and an electronic signal in two-ways. The audio codec 980 can convert sound information input or output through, for example, a speaker 982, a receiver 984, an earphone 986, or a microphone 988.

The camera module 991 is a device that can photograph an image and a moving picture and can include at least one image sensor (e.g., a front surface lens or a rear surface lens), an image signal processor (ISP) (not shown), or a flash LED (not shown) according to an embodiment.

The power management module 995 can manage power of the hardware 900. Although not shown, the power management module 995 can include, for example, a power management integrated circuit (PMIC), a charger integrated circuit (charge IC), or a battery fuel gauge.

The PMIC can be mounted within, for example, an integrated circuit or a SoC semiconductor. A charging method can be classified into a wired method and a wireless method. The charge IC can charge a battery and prevent an overvoltage or an overcurrent from being injected from a charging device. According to an embodiment, the charge IC can include a charge IC for at least one of a wired charge method or a wireless charge method. A wireless charge method can include, for example, a magnetic resonance method, a magnetic induction method, or an electromagnetic wave method and can add an additional circuit, for example, a circuit such as a coil loop, a resonant circuit, and a rectifier for wireless charge.

The battery gauge can measure, for example, a residual quantity of the battery 996 and a voltage, a current, or a temperature while charging. The battery 996 can generate electricity to supply power and can be, for example, a rechargeable battery.

The indicator 997 can display a specific the status, for example, a booting the status, a message the status, or a charge the status of the hardware 900 or a portion thereof (e.g., the AP 911). The motor 998 can convert an electrical signal to a mechanical vibration. A main control unit (MCU) (not shown) can control the sensor module 940.

Although not shown, the hardware 900 can include a processing device (e.g., GPU) for supporting a mobile TV. The processing device for supporting the mobile TV can process media data according to a specification of, for example, digital multimedia broadcasting (DMB), digital video broadcasting (DVB), or media flow. Each of the foregoing elements of hardware according to the present invention can be formed with at least one component, and a name of corresponding element can be changed according to a kind of an electronic device. Hardware according to the present invention can include at least one of the foregoing elements and can be formed in a form in which some elements are omitted or hardware can further include additional another element. Further, some of elements of hardware according to the present invention are coupled to form an entity, thereby equally performing a function of corresponding elements before coupling.

According to an embodiment, a method of operating the electronic device 101 can include the operation of detecting notification, the operation of acquiring communication connection information with another electronic device, the operation of acquiring situation information of another electronic device, and the operation of transferring notification to another electronic device based on communication connection information or situation information.

According to various embodiments, operation of transferring notification can include operation of acquiring situation information of an electronic device and operation of transferring notification based on situation information of an electronic device and situation information of another electronic device.

According to various embodiments, the operation of transferring notification can further include operation of checking an operation the status of an electronic device or another electronic device and operation of transferring notification to another electronic device based on an operation the status.

According to various embodiments, the electronic device includes a first processor and a second processor, and operation of transferring notification can further include the operation of selecting at least one of a first processor or a second processor based on an operation the status, the operation of processing notification in the first processor or the second processor based on the selection, and the operation of transferring notification to another electronic device.

According to various embodiments, the operation of checking can include the operation of checking an application that provides in an electronic device or another electronic device. According to various embodiments, the operation of checking can include operation of determining a load of data while operating in an electronic device or another electronic device. According to various embodiments, the operation of checking can include operation of checking a power source the status (e.g., a battery the status) of an electronic device or another electronic device. According to various embodiments, the operation of transferring can include operation of transferring a kind (e.g., call, text message, and alarm) of notification.

According to various embodiments, the operation of acquiring situation information can include operation of detecting a wearing status of another electronic device. According to various embodiments, the operation of acquiring situation information can include operation of detecting a motion of another electronic device. According to various embodiments, the operation of acquiring situation information can include operation of detecting at least one of the user's pupil or touch in another electronic device. According to various embodiments, the operation of acquiring situation information can include operation of acquiring distance information between an electronic device and another electronic device.

In a method and device for providing notification according to various embodiments, at least one electronic device of a plurality of electronic devices that can provide notification can be selected, notification can be provided through the selected electronic device and thus power consumption can be reduced.

Further, in a method and device for providing notification according to various embodiments, it can be determined whether the user checks notification and notification in which the user does not check can be provided and thus use convenience can be provided.

A method in an electronic device, the method comprising: determining notification information; acquiring state information of at least one of the electronic device and at least one external device communicating with the electronic device; and providing the notification information through at least one of the electronic device and the at least one external device based on the state information.

Wherein the determining of notification information comprises determining, by a user of the electronic device, information that is not checked through the electronic device as the notification information.

Wherein the determining of notification information comprises determining information that is not transmitted from the electronic device to the at least one external device as the notification information.

Wherein the acquiring of state information comprises acquiring the notification information having a first priority and information about an application having a second priority executing in the electronic device. And the providing of the notification information comprises: providing the notification information through the electronic device based on that the first priority is higher than the second priority; and providing the notification information through the at least one external device based on that the first priority is lower than the second priority.

Wherein the providing of the notification information comprises providing the notification information through an enabled device of the electronic device and the at least one external device.

Wherein the providing of the notification information comprises providing the notification information through a device that acquires user information corresponding to information set to be related to the user of the electronic device.

Wherein the providing of the notification information comprises providing the notification information through a device corresponding to the state information, when power source information or load information acquired as the state information corresponds to a range designated to the electronic device.

Wherein the providing of the notification information comprises: providing the notification information through the electronic device, when the electronic device or the at least one external device is located at a first location; and providing the notification information through the at least one external device when the electronic device or the at least one external device is located at a second location.

Wherein the providing of the notification information comprises: providing the notification information through the electronic device, when time information acquired as the state information is a first time; and providing the notification information through the at least one external device, when time information acquired as the state information is a second time.

Wherein the providing of the notification information comprises transmitting the notification information to the at least one external device, when communication information or distance information between the electronic device and the at least one external device belongs to a range designated to the electronic device.

Wherein the electronic device comprises a first processor that processes an application and a second processor that controls communication of the electronic device, and the providing of the notification information comprises transmitting the notification information to the at least one external device through the second processor, when the first processor executes the application. And further comprising: acquiring check information on whether a user of the electronic device and the at least one external device checks the notification information or transmitting information on whether the electronic device transmits the notification information to the at least one external device; and storing the check information or the transmitting information at a database functionally connected to the electronic device. And the storing of the check information comprises updating the database, when the check information or the transmitting information is changed.

A term "module" used for the present invention can indicate a unit including a combination of one or two or more of, for example, hardware, software, or firmware. The "module" can be interchangeably used with a term of, for example, a unit, logic, a logical block, a component, or a circuit. The "module" can become a minimum unit or a portion of an integrally formed component. The "module" can become a minimum unit or a portion that performs at least one function. The "module" can be mechanically or electronically embodied. For example, a "module" according to the present invention can include at least one of an application-specific integrated circuit (ASIC) chip, field-programmable gate arrays (FPGAs), and a programmable-logic device that performs some operations that are known or to be developed in the future.

According to various embodiments, at least a portion of a device (e.g., modules or functions) or a method (e.g., operations) according to the present invention can be embodied with an instruction stored at computer-readable storage media in a form of, for example, a programming module. When the instruction is executed by at least one processor (e.g., the processor 810), the at least one processor can perform a function corresponding to the instruction. The computer-readable storage media can be, for example, the memory 860. At least a portion of the programming module can be implemented (e.g., executed) by, for example, the processor 810. At least a portion of the programming module can include, for example, a module, an application, a routine, and sets of instructions and/or a process for performing at least one function.

An electronic device, comprising: a determining module that determines notification information in the electronic device; an acquiring module that acquires state information of at least one of the electronic device and at least one external device that communicates with the electronic device; and a providing module that provides the notification information through at least one of the electronic device and the at least one external device based on the state information.

Wherein the acquiring module acquires information corresponding to designated information as the state information based on an attribute of the notification information.

Wherein the providing module provides the notification information through a device in which a user presently uses based on state information of the user of the electronic device acquired as the state information.

Wherein the providing module provides the notification information through an enabled device of the electronic device and the at least one external device.

Wherein the providing module transmits the notification information to the at least one external device, when an application executing in the electronic device has a priority higher than that of the notification information.

A computer readable recording medium on which an application or a program for performing operation of determining notification information in an electronic device; operation of acquiring state information of at least one of the electronic device and at least one external device that communicates with the electronic device; and operation of providing the notification information through at least one of the electronic device and the at least one external device based on the state information is recorded.

A programming module according to the present invention can include at least at least one of the foregoing elements or can further include elements in which some elements are omitted or additional other elements. A programming module according to the present invention or operations performed by another element can be executed with a sequential, parallel, repetitional, or heuristic method.

Further, some operations can be executed in another order or are omitted, or other operations can be added thereto.

The computer readable recording media can include magnetic media such as a hard disk, a floppy disk, and a magnetic tape, optical media such as a compact disc read-only memory (CD-ROM) or a digital versatile disc (DVD), magnetic-optical media such as a floptical disk, and a hardware device specially formed to store and perform an application instruction (e.g., a programming module) such as a read-only memory (ROM), a read access memory (RAM), and a flash memory. Further, the application instruction can include a high-level language code that can be executed by a computer using an interpreter as well as a machine language code made by a compiler. The foregoing hardware device can be formed to operate as at least one software module to perform operation of the present invention and vice versa.

While the present invention has been particularly shown and described with reference to embodiments thereof, it will be understood by those skilled in the art that various changes in form and details may be made therein without departing from the spirit and scope of the present invention as defined by the appended claims.

What is claimed is:

1. A method in an electronic device, the method comprising:
    establishing a communication path between the electronic device and an external device;
    detecting an event to generate a notification in the electronic device;
    obtaining status information associated with at least one of the electronic device or the external device;
    selecting at least one of the electronic device or the external device in accordance with the status information associated with the at least one of the electronic device or the external device;
    displaying the notification associated with the event by the electronic device when the electronic device is selected; and
    transmitting the notification associated with the event to the external device when the external device is selected.

2. The method of claim 1, wherein the electronic device is configured to transmit the notification to the external device when a screen of the electronic device is not available to display the notification.

3. The method of claim 1, wherein the electronic device is further configured to display the notification when the external device is not available to display the notification.

4. The method of claim 1, further comprising:
    determining whether the event has a higher priority than the status information of the electronic device.

5. The method of claim 1, further comprising:
    determining which one of the electronic device and the external device being positioned within visibility of a user; and
    displaying the notification on the determined device.

6. The method of claim 1, further comprising:
    measuring a distance between the electronic device and the external device; and
    transmitting the notification when the distance is less than a threshold distance.

7. The method of claim 1, further comprising:
    when the notification is transmitted to the external device, determining whether the notification on the external device is read; and
    storing a reading status of the notification in the electronic device.

8. An electronic device, comprising:
    a transceiver configured to establish a communication path between the electronic device and an external device;
    a memory; and
    a processor operatively coupled to the transceiver and the memory, configured to:
        detect an event to generate a notification in the electronic device;
        obtain status information associated with at least one of the electronic device or the external device;
        select at least one of the electronic device or the external device in accordance with the status information associated with the at least one of the electronic device or the external device;
        display the notification associated with the event in the electronic device when the electronic device is selected; and
        transmit the notification associated with the event to the external device when the external device is selected.

9. The electronic device of claim 8, wherein the electronic device is configured to transmit the notification to the external device when a screen of the electronic device is not available to display the notification.

10. The electronic device of claim 8, wherein the electronic device is further configured to display the notification when the external device is not available to display the notification.

11. The electronic device of claim 8, wherein the processor is further configured to determine whether the event has a higher priority than the status information of the electronic device.

12. The electronic device of claim 8, wherein the processor is further configured to:
    determine which one of the electronic device and the external device being positioned within visibility of a user; and
    display the notification on the determined device.

13. The electronic device of claim 8, wherein the processor is further configured to:
    measure a distance between the electronic device and the external device; and
    transmit the notification when the distance is less than a threshold distance.

14. The electronic device of claim 8, wherein the processor is further configured to:
    when the notification is transmitted to the external device, determine whether the notification on the external device is read; and
    storing reading status of the notification to be stored in the electronic device.

15. A method in an electronic device, the method comprising:
    establishing a communication path between the electronic device and a first external device;
    receiving notification information from a second external device;
    identifying information of an application that is executed in the electronic device;
    determining whether an input for identifying the notification information is detected in the electronic device as a function of time information;
    executing, by the electronic device, a function corresponding to the notification information in response to the determination that the input is detected within a predetermined time; and transmitting the notification information to the first external device in response to the determination that the input is not detected within the predetermined time.

16. The method of claim 15, wherein the notification information includes phone call, and
wherein the time information includes a predetermined time period.

17. An electronic device, comprising:
a transceiver configured to establish a communication between the electronic device and a first external device, to receive notification information from a second external device;
a memory; and
a processor operatively coupled to the transceiver and the memory, configured to:
identify information of an application that is executed in the electronic device;
determine whether an input for identifying the notification information is detected in the electronic device as a function of time information;
execute, by the electronic device, a function corresponding to the notification information in response to the determination that the input is detected within a predetermined time; and
transmit the notification information to the first external device in response to the determination that the input is not detected within the predetermined time.

18. The device of claim 17, wherein the notification information includes phone call, and wherein the time information includes a predetermined time period.

19. The method of claim 15, wherein the time information is adjusted in accordance with a user input.

20. The device of claim 17, wherein the time information is adjusted in accordance with a user input.

* * * * *